United States Patent [19]

Landré et al.

[11] Patent Number: 5,525,124
[45] Date of Patent: Jun. 11, 1996

[54] PROCESS FOR THE DYEING OF CELLULOSE-CONTAINING FIBRE MATERIALS WITH REACTIVE DYES

[75] Inventors: Jean-François Landré, Riedisheim, France; Athanassios Tzikas, Pratteln, Switzerland; Jean P. Luttringer, Rixheim, France

[73] Assignee: Ciba-Geigy Corporation, Tarrytown, N.Y.

[21] Appl. No.: 295,765

[22] PCT Filed: Feb. 24, 1993

[86] PCT No.: PCT/EP93/00426

§ 371 Date: Sep. 2, 1994

§ 102(e) Date: Sep. 2, 1994

[87] PCT Pub. No.: WO93/18224

PCT Pub. Date: Sep. 16, 1993

[30] Foreign Application Priority Data

Mar. 6, 1992 [CH] Switzerland ............... 714/92
Mar. 6, 1992 [CH] Switzerland ............... 715/92

[51] Int. Cl.$^6$ ............ D06P 1/382; D06P 1/384; D06P 3/66; D06P 3/872

[52] U.S. Cl. ............ 8/532; 8/549; 8/689; 8/918

[58] Field of Search ............ 8/532, 549, 918, 8/689

[56] References Cited

U.S. PATENT DOCUMENTS

| | | | |
|---|---|---|---|
| 4,670,547 | 6/1987 | Lehr | 534/637 |
| 4,900,813 | 2/1990 | Tzikas et al. | 534/635 |
| 4,975,530 | 12/1990 | Tzikas et al. | 534/633 |

FOREIGN PATENT DOCUMENTS

| | | |
|---|---|---|
| 0298041 | 1/1989 | European Pat. Off. . |
| 298041 | 1/1989 | European Pat. Off. . |
| 2173121 | 10/1973 | France . |
| 2228822 | 12/1974 | France . |
| 2511017 | 4/1982 | France . |
| 1389053 | 4/1975 | United Kingdom . |
| 1439801 | 6/1976 | United Kingdom . |
| 1529645 | 10/1978 | United Kingdom . |

OTHER PUBLICATIONS

E. R. Trotman, Dyeing and Chemical Technology of Textile Fibers, 6th ed no month available 1984, p. 509.
K. Venkataraman, The Chemistry of Synthetic Dyes, vol. VI, pp. 148 to 151, no month available, 1972.
Chemical Abstracts, vol. 103 (no month available 1985), No. 179653K.
Chemical Abstracts, vol. 103 (no month available 1985), No. 124990.
Chemical Abstracts, vol. 99 (no month available 1982), No. 39801.
English translation of JP-A-60/215882, Oct. 29, 1985.
Book of Pakers International Conference & Exhibition, Oct. 8–11, 1991.
K. Venkataraman, The Chemistry of Synthetic Dyes, vol. VI, pp. 416–417 (1972).

*Primary Examiner*—Margaret Einsmann
*Attorney, Agent, or Firm*—Kevin T. Mansfield

[57] ABSTRACT

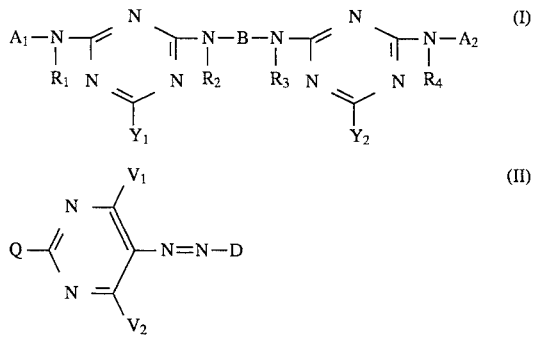

A process for the dyeing of cellulose-containing fibre materials with reactive dyes, which comprises carrying out dyeing in the presence of the salt of a mineral acid in an amount of 0 to 20 g per liter of dyebath and using at least one of the reactive dyes of formulae (I) and (II) in which the substituents are as defined in claim 1. This produces dyeings having good fastness properties in a high coloristic yield. Moreover, the addition of fairly large amounts of salts of a mineral acid, which is a common practice in dyeing, can be omitted.

18 Claims, No Drawings

PROCESS FOR THE DYEING OF CELLULOSE-CONTAINING FIBRE MATERIALS WITH REACTIVE DYES

The present invention relates to a process for the dyeing of cellulose-containing fibre materials with reactive dyes.

In view of the increasing demands on reactive dyeings with respect to economy, application technology and level of fastness properties, the level obtained is in many cases not fully satisfactory. Thus, it is still customary to carry out dyeing in the presence of fairly large amounts of salts of a mineral acid, which may lead to pollution of the waste water.

Accordingly, the object of the present invention was to provide improved processes for the dyeing of cellulose-containing fibre materials with reactive dyes using, in particular, only small amounts of salts of a mineral acid. It has now been found that the process according to the invention fulfils the requirements mentioned.

Accordingly, the invention relates to a process for the dyeing of cellulose-containing fibre materials with reactive dyes, which comprises carrying out dyeing in the presence of the salt of a mineral acid in an amount of 0 to 20 g per liter of dyebath and using at least one of the reactive dyes of the formulae

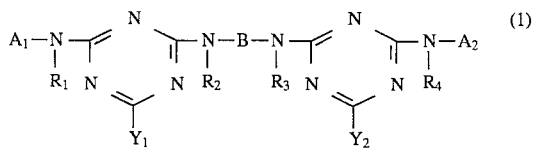

in which $A_1$ is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $A_2$, independently of $A_1$, has the meanings of $A_1$ or is hydrogen or a colourless organic radical, $R_1$, $R_2$, $R_3$ and $R_4$, independently of one another, are hydrogen or substituted or unsubstituted $C_1$–$C_4$ alkyl, B is an aliphatic or aromatic bridging member and $Y_1$ and $Y_2$, independently of one another, are fluorine or carboxypyridinium, and

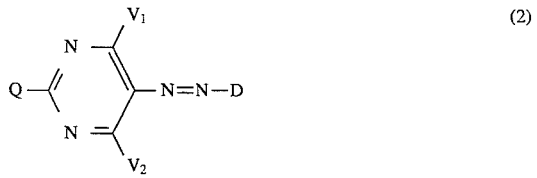

in which D is the radical of a diazo component, Q is a substituted or unsubstituted phenyl or naphthyl radical or a substituted or unsubstituted aromatic-heterocyclic radical and $V_1$ and $V_2$, independently of one another, are a radical of the formula

in which $R_5$ and $R_6$, independently of one another, are hydrogen, substituted or unsubstituted aryl or substituted or unsubstituted $C_1$–$C_6$alkyl, where alkyl, with the exception of methyl, may be interrupted by —O— or —NR'— and R' is hydrogen or $C_1$–$C_4$alkyl, or $R_5$ and $R_6$ together with the nitrogen atom linking them form a heterocyclic 5- or 6-membered ring which, if desired, may be further substituted, with the proviso that at least one of the radicals $V_1$, $V_2$ and D contains a fibre-reactive group.

The present invention furthermore relates to a process for the dyeing of blends of cellulose fibre materials with polyester fibres in the presence of reactive dyes and disperse dyes, which comprises carrying out dyeing in the presence of the salt of a mineral acid in an amount of 0 to 40 g per liter of dyebath, at a temperature of 80° to 150° C. and a pH of 5 to 11 and using at least one of the reactive dyes of the abovementioned formulae (1) and (2) as the reactive dye.

The radicals $A_1$ and $A_2$ in the dye of the formula (1) may contain substituents customary in organic dyes bonded to their basic structure.

Examples of substituents in the radicals $A_1$ and $A_2$ include: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, in particular alkanoylamino groups, such as acetylamino, propionylamino or benzoylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)sulfamoyl, N,N-di-(β-hydroxyethyl)sulfamoyl, N-phenylsulfamoyl, ureido, hydroxyl, carboxyl, sulfomethyl or sulfo and fibre-reactive radicals. The radical A or $A_2$ preferably contains one or more sulfo groups. $A_1$ or $A_2$ as the radical of an azo dye or formazan dye contains, as substituents, in particular methyl, ethyl, methoxy, ethoxy, acetylamino, benzoylamino, amino, chlorine, bromine, ureido, hydroxyl, carboxyl, sulfomethyl or sulfo.

Examples of a reactive group in the radical $A_1$ or $A_2$ in the dye of the formula (1) and in the radical $V_1$, $V_2$ or D in the dye of the formula (2) are an alkanoyl or alkylsulfonyl radical substituted by a detachable atom or a detachable group, an alkenoyl or alkenesulfonyl radical which is unsubstituted or substituted by a detachable atom or a detachable group, or an alkenoyl or alkenesulfonyl radical containing a vinyl group. In general, the alkanoyl, alkylsulfonyl and alkenesulfonyl radicals contain 2 to 8 carbon atoms and the alkenoyl radicals 3 to 8 carbon atoms. Further examples are radicals containing carbo- or heterocyclic 4-, 5- or 6-membered rings which are substituted by a detachable atom or a detachable group. Examples of suitable heterocyclic radicals are those which contain at least one detachable substituent bonded to a heterocyclic radical; these include those containing at least one reactive substituent bonded to a 5- or 6-membered heterocyclic ring, such as to a monoazine, diazine, triazine, pyridine, pyrimidine, pyridazine, pyrazine, thiazine, oxazine or unsymmetrical or symmetrical triazine ring or to a ring system of this type containing one or more fused-on aromatic rings, such as a quinoline, phthalazine, cinnoline, quinazoline, quinoxaline, acridine, phenazine and phenanthridine ring system.

Apart from others, examples of detachable atoms or detachable groups are halogen, such as fluorine, chlorine or bromine, ammonium, including hydrazinium, sulfato, thiosulfato, phosphato, acetoxy, propionoxy, azido, carboxypyridinium or thiocyanato.

Suitable bridging members between the dye radical and the fibre-reactive radical include, apart from the direct bond, a wide range of radicals. The bridging member can be, for example, an aliphatic, aromatic or heterocyclic radical; furthermore, the bridging member can also be composed of a wide range of such radicals. As a rule, the bridging member contains at least one functional group, for example a carbonyl group or an amino group, it being possible for the amino group to be further substituted by $C_1$–$C_4$alkyl which is unsubstituted or substituted by halogen, hydroxyl, cyano, $C_1$–$C_4$alkoxy, $C_1$–$C_4$alkoxycarbonyl, carboxyl, sulfamoyl, sulfo or sulfato. Examples of suitable aliphatic radicals are alkylene radicals having 1 to 7 carbon atoms or branched isomers thereof. The carbon chain of the alkylene radical can be interrupted by a hetero atom, for example an oxygen atom. A suitable aromatic radical is, for example, a phenyl radical, which may be substituted by $C_1$–$C_4$alkyl, for example methyl or ethyl, $C_1$–$C_4$alkoxy, for example methoxy or ethoxy, halogen, for example fluorine, bromine or, in particular, chlorine, carboxyl or sulfo, and a suitable heterocyclic radical is, for example, a piperazine radical.

Examples of reactive groups include the following: vinylsulfonyl, β-chloroethylsulfonyl, β-sulfatoethylsulfonyl, β-acetoxyethylsulfonyl, phosphatoethylsulfonyl, β-thiosulfatoethylsulfonyl, N-methyl-N-(β-sulfoethylsulfonyl)amino, acryloyl, mono-, di- or trichloroacryloyl such as —CO—CCl=CH$_2$, —CO—CH=CH—Cl, —CO—CCl=CH—CH$_3$; mono-, di- or tribromoacryloyl, such as —CO—CBr=CH$_2$, —CO—CH=CH—Br, —CO—CBr=CH—CH$_3$; and —CO—CCl=CH—COOH, —CO—CH=CCl—COOH, —CO—CBr=CH—COOH, —CO—CH=CBr—COOH, —CO—CCl=CCl—COOH, —CO—CBr=CBr—COOH; precursors of the acryloyl derivates of the acryloyl radical, such as β-chloro- or β-bromopropionyl, 3-phenylsulfonylpropionyl, 3-methylsulfonylpropionyl, 2-chloro- 3-phenylsulfonylpropionyl, 2,3-dichloropropionyl, 2,3-dibromopropionyl; and 2-fluoro-2-chloro-3,3-difluorocyclobutane- 1-carbonyl, 2,2,3,3-tetrafluorocyclobutane- 1-carbonyl- or -1-sulfonyl, β-(2,2,3,3-tetrafluoro- 1-cyclobutyl)acryloyl, α- or β-alkenyl or arylsulfonylacryloyl groups, such as α- or β-methylsulfonylacryloyl, chloroacetyl, bromoacetyl, 4-(β-chloroethylsulfonyl)butyryl, 4-vinylsulfonylbutyryl, 5-(β-chloroethylsulfonyl)caproyl, 6-vinylsulfonylcaproyl; and 4-fluoro-3-nitrobenzoyl, 4-fluoro-3-nitrophenylsulfonyl, 4-fluoro-3-methylsulfonylbenzoyl, 4-fluoro-3-cyanobenzoyl, 2-fluoro- 5-methylsulfonylbenzoyl.

Furthermore, the following examples of fibre-reactive radicals may be mentioned: mono- or dihalo-symmetricaltriazinyl radicals, for example 2,4-dichloro-6-triazinyl, 2-amino-4-chloro-6-triazinyl, 2-alkylamino- 4-chloro-6-triazinyl, such as 2-methylamino- 4-chloro-6-triazinyl, 2-ethylamino- or 3-propylamino-4-chloro-6-triazinyl, 2-β-hydroxyethylamino-4-chloro-6-triazinyl, 2-di-(β-hydroxy)ethylamino-4-chloro- 6-triazinyl and the corresponding sulfuric monoesters, 2-diethylamino-4-chloro-6-triazinyl, 2-morpholino- or 2-piperidino-4-chloro-6-triazinyl, 2-cyclohexylamino-4-chloro6-triazinyl, 2-arylamino- and substituted 2-arylamino-4-chloro-6-triazinyl, such as 2-phenylamino-4-chloro-6-triazinyl, 2-(o-, m- or p-carboxy- or -sulfophenyl)amino4-chloro-6-triazinyl, 2-alkoxy-4-chloro-6-triazinyl, such as 2-methoxy- or 2-ethoxy-4-chloro-6-triazinyl, 2-(phenylsulfonylmethoxy)-4-chloro-6-triazinyl, 2-aryloxy- and substituted 2-aryloxy-4-chloro-6-triazinyl, such as 2-phenoxy-4-chloro-6-triazinyl, 2-(p-sulfophenoxy)-4-chloro-6-triazinyl, 2-(o-, m- or p-methyl- or methoxyphenoxy)-4-chloro-6-triazinyl, 2-alkylmercapto- or 2-arylmercapto- or substituted 2-arylmercapto-4-chloro-6-triazinyl, such as 2-β-hydroxy-ethylmercapto-4-chloro- 6-triazinyl, 2-phenylmercapto-4-chloro-6-triazinyl, 3-(4'-methylphenylmercapto)-4-chloro-6-triazinyl, 2-(2',4'-dinitrophenylmercapto)- 4-chloro-6-triazinyl, 2-methyl-4-chloro- 6-triazinyl, 2-phenyl-4-chloro-6-triazinyl, 2,4-difluoro-6-triazinyl, monofluorotriazinyl radicals substituted by amino, alkylamino, aralkylamino or acylamino groups, alkyl being in particular substituted or unsubstituted $C_1$–$C_4$alkyl, aralkyl being in particular substituted or unsubstituted phenyl-$C_1$–$C_4$alkyl and aryl being in particular phenyl or naphthyl which is unsubstituted or substituted by sulfo, $C_1$–$C_4$alkyl, $C_1$–$C_4$alkoxy, carboxyl, acylamino groups and halogen atoms, such as fluorine, chlorine or bromine, for example 2-amino- 4-fluoro-6-triazinyl, 2-methylamino- 4-fluoro-6-triazinyl, 2-ethylamino-4-fluoro- 6-triazinyl, 2-isopropylamino-4-fluoro- 6-triazinyl, 2-dimethylamino-4-fluoro-6-triazinyl, 2-diethylamino-4-fluoro-6-triazinyl, 2-β-methoxyethylamino-4-fluoro-6-triazinyl, 2-β-hydroxyethylamino-4-fluoro-6-triazinyl, 2-di-(β-hydroxyethyl)amino-4-fluoro-6-triazinyl, 2-β-sulfoethylamino-4-fluoro- 6-triazinyl, 2-N-(β-sulfoethyl)-N-methylamino- 4-fluoro-6-triazinyl, 2-carboxymethylamino-4-fluoro-6-triazinyl, 2-β-cyanoethylamino-4-fluoro-6-triazinyl, 2-phenylamino-4-fluoro-6-triazinyl, 2-β-phenylethylamino-4-fluoro-6-triazinyl, 2-N-benzyl-N-methylamino-4-fluoro-6-triazinyl, 2-(2'-, 3'- or 4'-sulfobenzyl)amino-4-fluoro-6-triazinyl, 2-cyclohexylamino-4-fluoro-6-triazinyl, 2-(o-, m-, p-methylphenyl)amino-4-fluoro-6-triazinyl, 2-(o-, m-, p-sulfophenyl)amino-4-fluoro- 6-triazinyl, 2-(2',5'-disulfophenyl)amino-4-fluoro-6-triazinyl, 2-(o-, m-, p-chlorophenyl)-amino-4-fluoro-6-triazinyl, 2-(o-, m-, p-methoxyphenyl)- 4-fluoro-6-triazinyl, 2-(2'-methyl-4'-sulfophenyl)amino- 4-fluoro-6-triazinyl, 2-(2'-methyl- 5'-sulfophenyl)-amino- 4-fluoro-6-triazinyl, 2-(2'-chloro- 4'-sulfophenyl)amino-4-fluoro-6-triazinyl, 2-(2'-chloro-5'-sulfophenyl)amino- 4-fluoro-6-triazinyl, 2-(2'-methoxy-4'-sulfophenyl)amino- 4-fluoro-6-triazinyl, 2-(o-, m-, p-carboxyphenyl)amino- 4-fluoro-6-triazinyl, 2-(2',4 '-disulfophenyl)amino-4-fluoro-6-triazinyl, 2-(3',5'-disulfophenyl)amino-4-fluoro- 6-triazinyl, 2-(2'-carboxy-4 '-sulfophenyl)amino-4-fluoro-6-triazinyl, 2-( 2'-carboxy-4'-sulfophenyl)amino-4-fluoro- 6-triazinyl, 2-(6'-sulfo-2'-naphthylamino)- 4-fluoro-6-triazinyl, 2-(4',8'-disulfo- 2'-naphthylamino)-4-fluoro-6-triazinyl, 2-( 6',8'-disulfo-2'-naphthylamino)-4-fluoro- 6-triazinyl, 2-(N-methylphenylamino)-4-fluoro- 6-triazinyl, 2-(N-ethylphenylamino)-4-fluoro-6-triazinyl, 2-[N-(β-hydroxyethyl)phenylamino]-4-fluoro- 6-triazinyl, 2-(N-isopropylamino)-4-fluoro- 6-triazinyl, 2-morpholino-4-fluoro- 6-triazinyl, 2-piperidino-4-fluoro-6-triazinyl, 2-(4', 6',8'-trisulfo- 2'-naphthyl)-4-fluoro-6-triazinyl, 2-( 3',6',8'-trisulfo-2'-naphthyl)-4-fluoro- 6-triazinyl, 2-(3',6'-disulfo-1'-naphthyl)- 4-fluoro-6-triazinyl, mono-, di- or trihalopyrimidinyl radicals, such as 2,4-dichloro-6-pyrimidinyl, 2,4,5-trichloro-6-pyrimidinyl, 2,4-dichloro- 5-nitro- or -5-methyl- or -5-carboxymethyl- or - 5-carboxy- or -5-cyano- or -5-vinyl- or -5-sulfo- or -5-mono-, -di- or -trichloromethyl- or - 5-carboalkoxy-6-pyrimidinyl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl-, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline3-carbonyl, 2- or 3-monochloroquinoxaline-6-carbonyl, 2- or 3-monochloroquinoxaline6-sulfonyl, 2,3-dichloroquinoxaline-6-carbonyl, 2,3-dichloroquinoxaline-6-sulfonyl, 1,4-dichlorophthalazine-6-sulfonyl or -6-carbonyl, 2,4-dichloroquinazoline-7- or -6-sulfonyl or -carbonyl, 2- or 3- or 4-( 4',5'-dichloro-1'-pyridazin-6 '-yl)phenylsulfonyl or -carbonyl, β-(4',5'-dichloro-1'-pyridazon- 6'-yl)ethylcarbonyl, N-methyl-N-(2,4- 6-yl)carbamyl, N-methyl-N-(2-methylamino- 4-chloro-triazin- 6-yl)carbamyl, N-methyl-N-(2-dimethylamino- 4-chlorotriazin-6-yl)carbamyl, N-methyl- or N-ethyl-N-(2,4-dichlorotriazin-6-yl)aminoacetyl-, N-methyl-N(2,3-dichloro-quinoxaline-6-sulfonyl)aminoacetyl, N-methyl-N-(2,3-dichloro-quinoxaline- 6-carbonyl)aminoacetyl, and the corresponding bromine and fluorine derivates of the abovementioned chlorine-substituted heterocyclic radicals, including, for example, 2-fluoro-4-pyrimidinyl, 2,6-difluoro- 4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro- 5-methyl-4-pyrimidinyl, 2,5,6-trifluoro-4-pyrimidinyl, 5-chloro- 6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro- 6-methyl-4-pyrimidinyl, 2-fluoro-5-chloro-6-methyl-4-pyrimidinyl, 2-fluoro-5-chloro- 4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl- 4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl- 4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro- 6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro- 5-trifluommethyl-4-pyrimidinyl, 6-fluoro- 5-chloro-4-pyrimidinyl, 6-fluoro- 5-trifluoromethyl-4-pyrimidinyl, 6-fluoro- 2-methyl-4-pyrimidinyl, 6-fluoro-5-chloro-2-methyl-4-pyrimidinyl, 5,6-difluoro-4-pyrimidinyl, 6-fluoro-5-chloro-2-trifluoromethyl- 4-pyrimidinyl, 6-fluoro-2-phenyl-4-pyrimidinyl, 6-fluoro-5-cyano-4-pyrimidinyl, 6-fluoro- 5-nitro-4-pyrimidinyl, 6-fluoro-5-methylsulfonyl-4-pyrimidinyl, 6-fluoro-5-phenylsulfonyl-4-pyrimidinyl, sulfonyl-containing triazine radicals, such as 2,4-bis(phenylsulfonyl)-6-triazinyl, 2-(3'-carboxyphenyl)sulfonyl-4-chloro- 6-triazinyl, 2-(3'-sulfophenyl)sulfonyl-4-chloro-6-triazinyl, 2,4-bis-(3 '-carboxyphenylsulfonyl)-6-triazinyl; sulfonyl-containing pyrimidine rings, such as 2-carboxymethylsulfonyl- 4-pyrimidinyl, 2-methylsulfonyl-6-methyl-4-pyrimidinyl, 2-methylsulfonyl-6-ethyl-4-pyrimidinyl, 2-phenylsulfonyl-5-chloro-6-methyl- 4-pyrimidinyl, 2,6-bis(methylsulfonyl)-4-pyrimidinyl, 2,6-bis(methylsulfonyl)-5-chloro-4-pyrimidinyl, 2,4-bis(methylsulfonyl)pyrimidine-5-sulfonyl, 2-methylsulfonyl-4-pyrimidinyl, 2-phenylsulfonyl-4-pyrimidinyl, 2-trichloromethylsulfonyl-6-methyl-4-pyrimidinyl, 2-methylsulfonyl-5-chloro-6-methyl-4-pyrimidinyl, 2-methylsulfonyl-5-bromo-6-methyl- 4-pyrimidinyl, 2-methylsulfonyl-5-chloro- 6-ethyl-4-pyrimidinyl, 2-methylsulfonyl- 5-chloro-6-chloromethyl-4-pyrimidinyl, 2-methylsulfonyl-4-chloro-6-methylpyrimidine- 5-sulfonyl, 2-methylsulfonyl-5-nitro-6-methyl- 4-pyrimidinyl, 2,5,6-tris(methylsulfonyl)-4-pyrimidinyl, 2-methylsulfonyl-5,6-dimethyl- 4-pyrimidinyl, 2-ethylsulfonyl-5-chloro- 6-methyl-4-pyrimidinyl, 2-methylsulfonyl 6-chloro-4-pyrimidinyl, 2,6-bis(methylsulfonyl)- 5-chloro-4-pyrimidinyl, 2-methylsulfonyl-6-carbonyl-4-pyrimidinyl, 2-methylsulfonyl-5-sulfo-4-pyrimidinyl, 2-methylsulfonyl-6-carbomethoxy-4-pyrimidinyl, 2-methylsulfonyl-5-carboxy- 4-pyrimidinyl, 2-methylsulfonyl-5-cyano- 6-methoxy-4-pyrimidinyl, 2-methylsulfonyl- 5-chloro-4-pyrimidinyl, 2-sulfoethylsulfonyl- 6-methyl-4-pyrimidinyl, 2-methylsulfonyl- 5-bromo-4-pyrimidinyl, 2-phenylsulfonyl- 5-chloro-4-pyrimidinyl, 2-carboxymethylsulfonyl-5-chloro-6-methyl-4-pyrimidinyl, 2-methylsulfonyl-6-chloropyrimidine-4- and -5-carbonyl, 2,6-bis(methylsulfonyl)pyrimidine-4- or -5-carbonyl, 2-ethylsulfonyl- 6-chloropyrimidine-5-carbonyl, 2,4-bis(methylsulfonyl)pyrimidine-5-sulfonyl, 2-methylsulfonyl-4-chloro-6-methylpyrimidine-5-sulfonyl or -carbonyl, triazine rings containing ammonium groups, such as 2-trimethylammonio-4-phenylamino- or -4-(o-, m- or p-sulfophenyl)amino-6-triazinyl, 2-( 1,1-dimethylhydrazinio)-4-phenylamino- or -4-(o-, m- or p-sulfophenyl)amino-6-triazinyl, 2-(2-isopropyl- 1,1-dimethyl) hydrazinio- 4-phenylamino- or -4-(o-, m- or p-sulfophenyl)amino- 6-triazinyl, 2-N-aminopyrrolidinio- or 2-N-aminopiperidinio-4-phenylamino- or -4-(o-, m- or p-sulfophenyl)amino-6-triazinyl, 2-N-aminopyrrolidinio- or 2-N-aminopiperidinio- 4-phenylamino- or-4-(o-, m- or p-sulfophenyl)amino-6-triazinyl, furthermore 4-phenylamino- or 4-(sulfophenylamino)-6-triazinyl radicals which contain 1,4-bisazabicyclo[2.2.2]octane or 1,2-bisazabicyclo [0.3.3]octane bonded to the 2-position via a nitrogen bond in quaternary form, 2-pyridinio-4-phenylamino- or -4-(o-, m- or p-sulfophenyl)amino-6-triazinyl and the corresponding 2-onium-6-triazinyl radicals substituted in the 4-position by alkylamino, such as methylamino, ethylamino or β-hydroxyethylamino, or alkoxy, such as methoxy, or aroxy, such as phenoxy or sulfophenoxy groups; 2-chlorobenzothiazole-5- or -6-carbonyl or -5- or -6-sulfonyl, 2-arylsulfonyl- or -alkylsulfonylbenzothiazole-5- or -6-carbonyl or -5- or -6-sulfonyl, such as 2-methylsulfonyl- or 2-ethoxysulfonylbenzothiazole-5- or -6-sulfonyl or-carbonyl, 2-phenylsulfonylbenzothiazole- 5- or -6-sulfonyl or -carbonyl and the corresponding 2-sulfonylbenzothiazole-5- or - 6-carbonyl or -sulfonyl derivates containing sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro- 1-methylbenzimidazole-5- or - 6-carbonyl or -sulfonyl, 2-chloro-4-methyl-1,3-thiazole-5-carbonyl or -4- or -5-sulfonyl, N-oxide of 4-chloro- or 4-nitroquinoline-5-carbonyl and also the radicals 5-chloro-2,6-difluoro-1,3-dicyanophenyl, 2,4-difluoro- 1,3,5-tricyanophenyl, 2,4,5-trifluoro- 1,3-dicyanophenyl, 2,4-dichloro-5-methylsulfonyl-6-pyrimidinyl, 2,4-dichloro-5-ethylsulfonyl-6-pyrimidinyl, 2-fluoro-5-methylsulfonyl-6-( 2'-sulfophenylamino)-4-pyrimidinyl, 2,5-dichloro- 6-methylsulfonyl-4-pyrimidinyl.

A group of suitable reactive groups comprises those of the formulae

$$-SO_2-Z, \quad (4)$$

$$-W\text{-alk-}SO_2-Z \atop R \quad (4a)$$

$$-W\text{-alk-}E\text{-alk'-}SO_2-Z, \quad (4b)$$

$$-\text{alk-}W\text{-alk'-}SO_2-Z, \atop R \quad (4c)$$

$$-\text{O-alk-W-alk'-SO}_2-Z, \quad (4d)$$
$$\phantom{-\text{O-alk-W-}}|\phantom{\text{alk'-SO}_2-Z,}$$
$$\phantom{-\text{O-alk-W-alk'-SO}_2-Z,}R$$

$$-\text{W-arylene-N-alk-SO}_2-Z \quad (4e)$$
$$\phantom{-\text{W-arylene-}}|\phantom{-}|$$
$$\phantom{-\text{W-arylene-N}}R_7\phantom{-}R$$

and

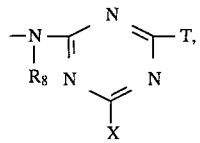
(5)

in which W is a group of the formula —SO$_2$—NR$_7$—, —CONR$_7$— or —NR$_7$CO—, R$_7$ is hydrogen, C$_1$–C$_4$alkyl which is unsubstituted or substituted by hydroxyl, sulfo, sulfato, carboxyl or cyano or is a radical of the formula $$-\text{alk-SO}_2-Z,$$
$$\phantom{-\text{alk-}}|$$
$$\phantom{-\text{alk-SO}_2-}R$$

R is hydrogen, hydroxyl, sulfo, sulfato, carboxyl, cyano, halogen, C$_1$–C$_4$alkoxycarbonyl, C$_1$–C$_4$alkanoyloxy, carbamoyl or the group —SO$_2$—Z, Z is the radical —CH=CH$_2$ or —CH$_2$—CH$_2$—Y, Y is a leaving group, E is the radical —O— or —NR$_9$—, R$_9$ is hydrogen or C$_1$–C$_4$alkyl, alk and alk', independently of one another, are C$_1$–C$_6$alkylene, arylene is a phenylene or naphthylene radical which is unsubstituted or substituted by sulfo, carboxyl, C$_1$–C$_4$ alkyl, C$_1$–C$_4$alkoxy or halogen, R$_8$ is hydrogen or C$_1$–C$_4$alkyl which is unsubstituted or substituted by carboxyl, cyano, hydroxyl, sulfo or sulfato and X is a group detachable as an anion and T is a radical of the formula $$-\text{N-alk-SO}_2-Z, \quad (6a)$$
$$\phantom{-}|$$
$$\phantom{-\text{N-}}R_7$$

$$-\text{N-alk-E-alk'-SO}_2-Z, \quad (6b)$$
$$\phantom{-}|$$
$$\phantom{-\text{N-}}R_8$$

$$-\text{N-arylene-SO}_2-Z, \quad (6c)$$
$$\phantom{-}|$$
$$\phantom{-\text{N-}}R_8$$

$$-\text{N-arylene-(alk)}_p\text{-W-alk'-SO}_2-Z \quad (6d)$$
$$\phantom{-}|$$
$$\phantom{-\text{N-}}R_8$$

or

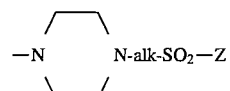
(6e)

in which R, R$_7$, R$_8$, E, W, Z, alk, alk' and arylene are as defined above and p is 0 or 1.

Examples of suitable leaving groups Y are —Cl, —Br, —F, —OSO$_3$H, —SSO$_3$H, —OCO—CH$_3$, —OPO$_3$H$_2$, —OCO—CCl$_3$, —OCO—CHCl$_2$, —OCO—CH$_2$Cl, —OSO$_2$—C$_1$–C$_4$alkyl, —OSO$_2$—N(C$_1$–C$_4$alkyl)$_2$ or —OCO—C$_6$H$_5$.

Y is preferably a group of the formula —Cl, —OSO$_3$H, —SSO$_3$H, —OCO—CH$_3$, —OCO—C$_6$H$_5$ or —OPO$_3$H$_2$, in particular —OSO$_3$H.

alk and alk' are, independently of one another, for example, a methylene, ethylene, 1,3-propylene, 1,4-butylene, 1,5-pentylene or 1,6-hexylene radical or branched isomers thereof.

alk and alk' are preferably a C$_1$–C$_4$alkylene radical and particularly preferably an ethylene radical.

R is preferably hydrogen or the group —SO$_2$—Z, in which Z is as defined above. Particularly preferably, R is hydrogen.

R$_7$ is preferably hydrogen, C$_1$–C$_4$alkyl or a group -alk-SO$_2$-Z, in which alk and Z are each as defined above.

R$_8$ is preferably a C$_1$–C$_4$alkyl radical and particularly preferably hydrogen.

Arylene is preferably a 1,3- or 1,4-phenylene radical which is unsubstituted or substituted by, for example, sulfo, methyl, methoxy or carboxyl.

E is preferably —NH— and particularly preferably —O—.

W is preferably a group of the formula —CONH— or —NHCO—.

X is, for example, fluorine, chlorine, bromine, sulfo, C$_1$–C$_4$alkylsulfonyl or phenylsulfonyl and preferably fluorine or chlorine.

Further interesting reactive groups are those of the formula (5) in which T is a group detachable as an anion or a non-reactive substituent.

T as a group detachable as an anion is, for example, fluorine, chlorine, bromine, sulfo, C$_1$–C$_4$alkylsulfonyl or phenylsulfonyl and preferably fluorine or chlorine.

T as a non-reactive substituent can be, for example, a hydroxyl, C$_1$–C$_4$alkoxy, C$_1$–C$_4$alkylthio, amino, N-C$_1$–C$_4$ alkylamino or N,N-di-C$_1$–C$_4$alkylamino, the alkyl being unsubstituted or substituted, for example, by sulfo, sulfato, hydroxyl, carboxyl or phenyl, a cyclohexylamino, morpholino or N-C$_1$–C$_4$ alkyl-N-phenylamino or phenylamino or naphthylamino radical, the phenyl or naphthyl being unsubstituted or substituted, for example, by C$_1$–C$_4$alkyl, C$_1$–C$_4$alkoxy, carboxyl, sulfo or halogen.

Examples of suitable non-reactive substituents T are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxyl.

A non-reactive substituent T is preferably amino, N-C$_1$–C$_4$alkylamino which is unsubstituted or substituted in the alkyl moiety by hydroxyl, sulfato or sulfo, or is morpholino, phenylamino or N-C$_1$–C$_4$alkyl-N-phenylamino, in which phenyl is in each case unsubstituted or substituted by sulfo, carboxyl, methyl or methoxy.

Further interesting reactive groups are pyrimidine or quinoxaline radicals, each of which possesses at least one group detachable as an anion. Examples are the 2,3-dichloroquinoxaline-6-carbonylamino radical, 2,4-dichloropyrimidine-5-carbonylamino radical and the radical of the formula

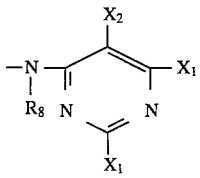
(7)

in which one of the radicals X$_1$ is a group detachable as an anion and the other radical X$_1$ has the meanings and preferences given for T as non-reactive substituent or is a radical of the formulae (6a) to (6e) or a group detachable as an anion, X$_2$ is an electronegative substituent and R$_8$ is, independently thereof, as defined under formula (5).

The radical $X_1$ detachable as an anion is preferably fluorine or chlorine, examples of suitable radicals $X_2$ are nitro, cyano, $C_1$–$C_4$ alkylsulfonyl, carboxyl, chlorine, hydroxyl, $C_1$–$C_4$alkoxysulfonyl, $C_1$–$C_4$ alkylsulfinyl, $C_1$–$C_4$alkoxycarbonyl or $C_2$–$C_4$alkanoyl, the meanings chlorine, cyano and methylsulfonyl being preferred for $X_2$.

Examples of suitable colourless organic radicals $A_2$ in the dye of the formula (1) are hydrogen, $C_1$–$C_6$alkyl, such as methyl, ethyl, propyl, isopropyl, butyl, isobutyl, sec-butyl or tert-butyl, $C_1$–$C_6$alkyl substituted by $C_1$–$C_4$alkoxy, hydroxyl, halogen or cyano, unsubstituted or $C_1$–$C_4$alkyl-substituted cyclohexyl, unsubstituted or $C_1$–$C_4$alkyl-, $C_1$–$C_4$alkoxy-, $C_2$–$C_4$alkanoylamino-, benzoylamino-, ureido-, carboxyl-, sulfo- or halogen-substituted phenyl or naphthyl, pyridyl, benzothiazolyl, oxazolyl or thiazolyl. It is also possible for $A_2$ and $R_4$ in formula (1) together with the nitrogen atom linking them to form a heterocyclic ring, for example piperidyl or morpholyl. $A_2$ is preferably a dye radical which, independently of $A_1$, is as defined above for $A_1$.

Particularly preferably, $A_1$ and $A_2$, independently of one another, are the radical of a monoazo, disazo or formazan dye, in particular radicals of the following formulae (8a) to (8t):

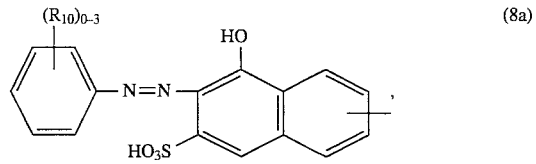
(8a)

in which $R_{10}$ is 0 to 3 identical or different substituents from the group consisting of $C_1$–$C_4$alkyl, $C_1$–$C_4$alkoxy, halogen, carboxyl and sulfo.

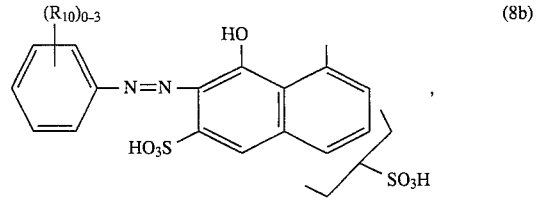
(8b)

in which $R_{10}$ is 0 to 3 identical or different substituents from the group consisting of $C_1$–$C_4$alkyl, $C_1$–$C_4$alkoxy, halogen, carboxyl and sulfo.

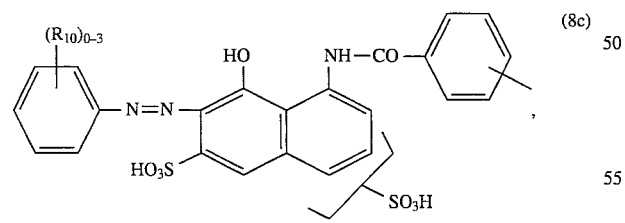
(8c)

in which $R_{10}$ is 0 to 3 identical or different substituents from the group consisting of $C_1$–$C_4$alkyl, $C_1$–$C_4$alkoxy, halogen, carboxyl and sulfo.

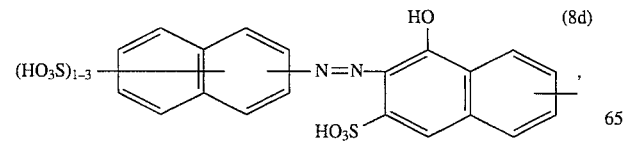
(8d)

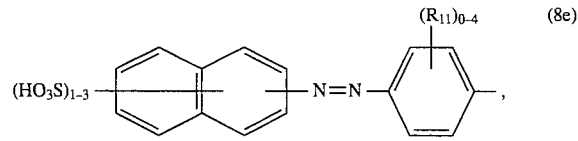
(8e)

in which $R_{11}$ is 0 to 4 identical or different substituents from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxyl, carboxyl, sulfomethyl and sulfo.

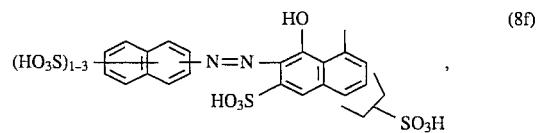
(8f)

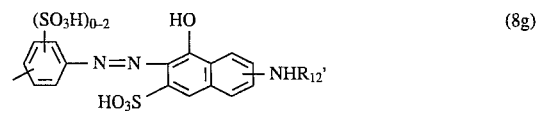
(8g)

in which $R_{12}$ is $C_1$–$C_4$alkanoyl or benzoyl.

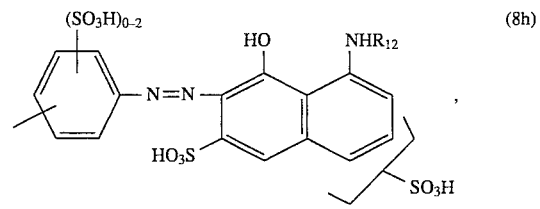
(8h)

in which $R_{12}$ is $C_1$–$C_4$alkanoyl or benzoyl.

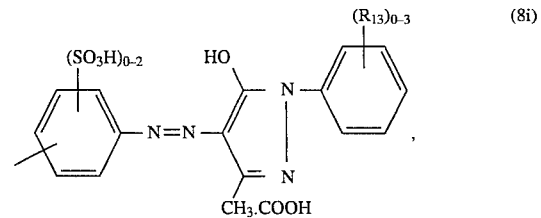
(8i)

in which $R_{13}$ is 0 to 3 identical or different substituents from the group consisting of $C_1$–$C_4$alkyl, $C_1$–$C_4$alkoxy, halogen, carboxyl and sulfo.

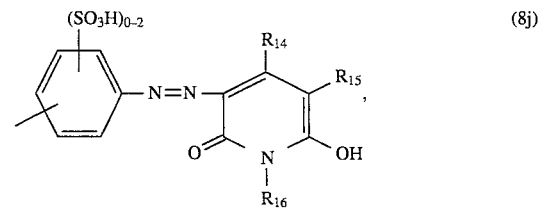
(8j)

in which $R_{14}$ and $R_{16}$, independently of one another, are hydrogen, $C_1$–$C_4$alkyl or phenyl, and $R_{15}$ is hydrogen, cyano, carbamoyl or sulfomethyl.

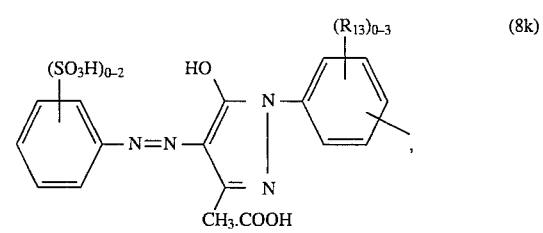
(8k)

in which $R_{13}$ is 0 to 3 identical or different substituents from the group consisting of $C_1$-$C_4$alkyl, $C_1$-$C_4$alkoxy, halogen, carboxyl and sulfo.

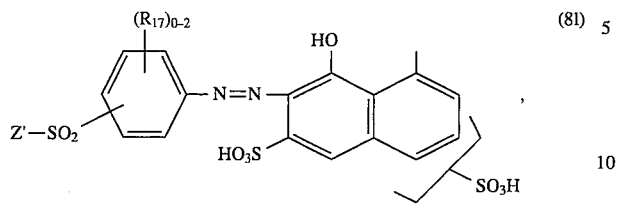
(8l)

in which $R_{17}$ is 0 to 2 identical or different substituents from the group consisting of $C_1$-$C_4$alkyl, $C_1$-$C_4$alkoxy, halogen, carboxyl and sulfo; and Z' is β-sulfatoethyl, β-thiosulfatoethyl, β-phosphatoethyl, β-acyloxyethyl, β-haloethyl or vinyl.

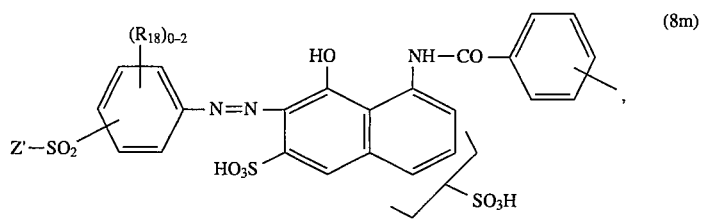
(8m)

in which $R_{18}$ is 0 to 2 identical or different substituents from the group consisting of $C_1$-$C_4$alkyl, $C_1$-$C_4$alkoxy, halogen, carboxyl and sulfo; and Z' is β-sulfatoethyl, β-thiosulfatoethyl, β-phosphatoethyl, β-acyloxyethyl, β-haloethyl or vinyl.

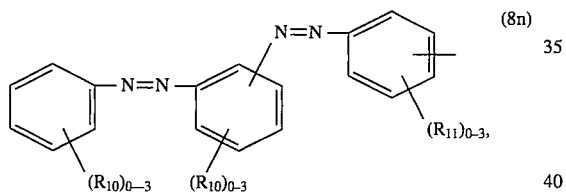
(8n)

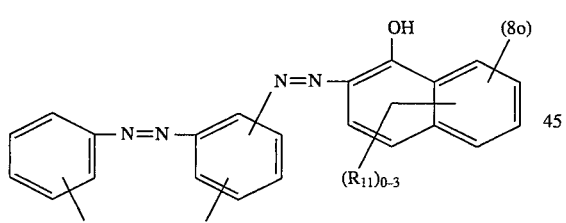
(8o)

and

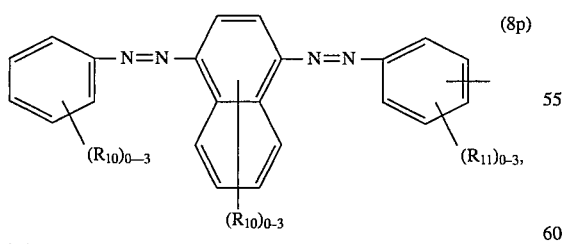
(8p)

in which $R_{10}$ is 0 to 3 identical or different substituents from the group consisting of $C_1$-$C_4$alkyl, $C_1$-$C_4$alkoxy, halogen, carboxyl and sulfo and $R_{11}$, is 0 to 3 identical or different substiments from the group consisting of halogen, nitro, cyano, trifluoromethyl, sulfamoyl, carbamoyl, $C_1$-$C_4$alkyl, $C_1$-$C_4$alkoxy, amino, acetylamino, ureido, hydroxyl, carboxyl, sulfomethyl and sulfo.

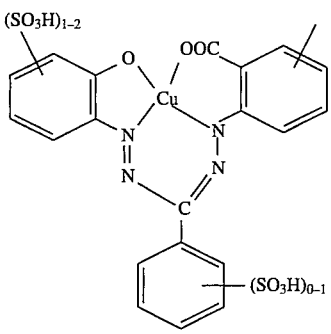
(8q)

or

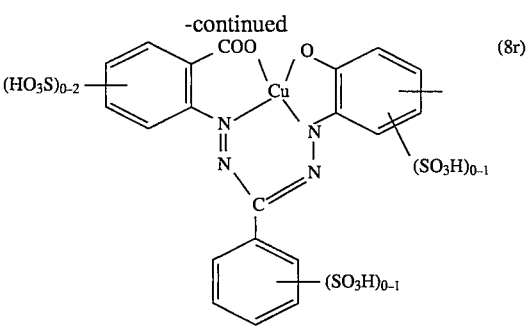
(8r)

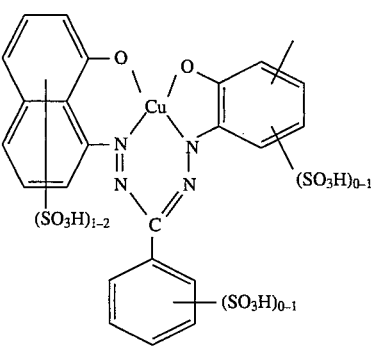
(8s)

or

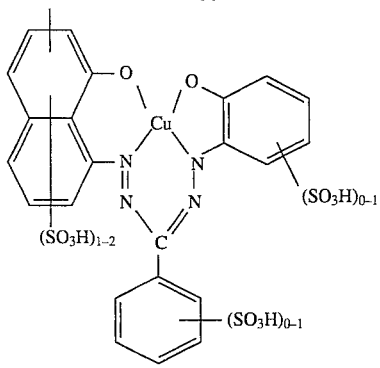
(8t)

in which the benzene rings can be further substituted by alkyl having 1 to 4 C atoms, alkoxy having 1 to 4 C atoms, alkylsulfonyl having 1 to 4 C atoms, halogen or carboxyl.

Of interest are also radicals of heavy metal complexes; suitable complexing heavy metals are in particular copper, nickel, cobalt or chromium. Preference is given to radicals of copper complex azo dyes, in particular those of the formulae (8 a) to (8k), which contain the copper atom bonded via an oxygen atom in each case in the ortho position relative to the azo bridge.

Examples of azo dyes which are suitable as radicals of metal complexes are:

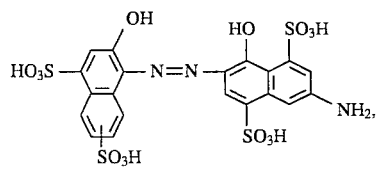
(9a)

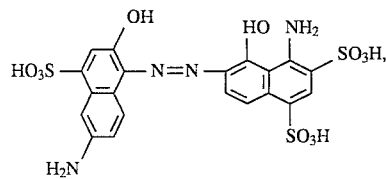
(9b)

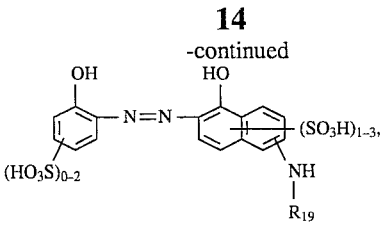
(9c)

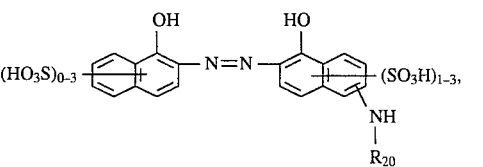
(9d)

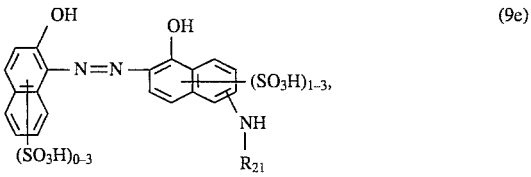
(9e)

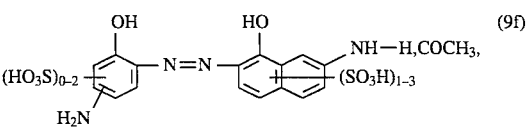
(9f)

Preferred metal atoms are Cu (1:1 complex) or Cr and Co (1:2 complex). Cr and Co complexes can contain the azo compound of the abovementioned formula once or twice, i.e. they can have a symmetrical structure or together with any other ligands form an unsymmetrical structure.

Preference is given to copper complexes, for example

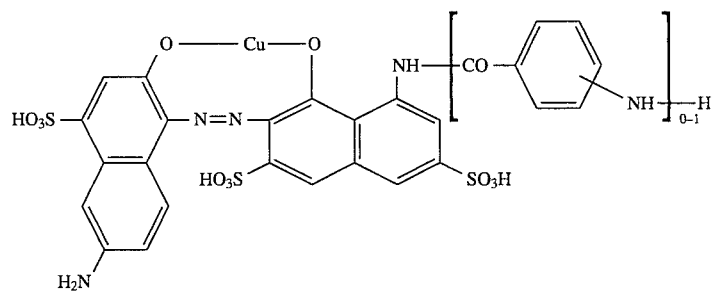
(10a)

and

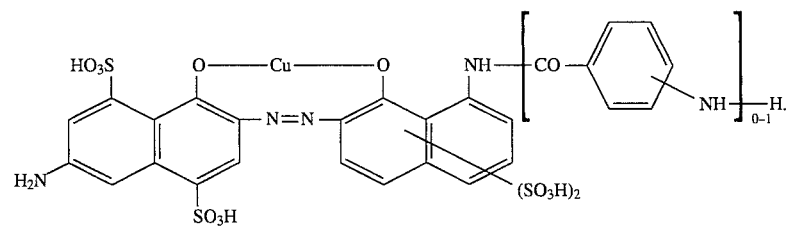
(10b)

In the formulae listed above, the radicals $R_{19}$ to $R_{21}$ are hydrogen or $C_1$–$C_4$alkyl. The radicals $R_{19}$ to $R_{21}$ are preferably hydrogen, methyl or ethyl. The aromatic rings in the above dyes of the formulae (9a) to (9f) and (10 a) and (10b) can be further substituted, the benzene rings in particular by methyl, ethyl, methoxy, ethoxy, methylsulfonyl, ethylsulfonyl, carboxyl, acetylamino or chlorine, and the naphthalene rings in particular by methoxy, carboxyl, acetylamino, nitro or chlorine. The benzene rings are preferably not further substituted.

The radicals $A_1$ and $A_2$ in the dye of the formula (1) are in particular identical and have the abovementioned meanings and preferences.

As alkyl radicals, the radicals $R_1$, $R_2$, $R_3$ and $R_4$ in the dye of the formula (1) are straight-chain or branched; the alkyl radicals can be further substituted, for example by halogen, hydroxyl, cyano, $C_1$–$C_4$alkoxy, $C_1$–$C_4$alkoxycarbonyl, carboxyl, sulfamoyl, sulfo or sulfato. The following radicals may be mentioned as examples of $R_1$, $R_2$, $R_3$ and R4: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxybutyl, β-hydroxypropyl, β-cyanoethyl, sulfomethyl, β-sulfoethyl, aminosulfonylmethyl and β-sulfatoethyl. Preferably, $R_1$, $R_2$, $R_3$ and $R_4$, independently of one another, are hydrogen, methyl or ethyl, in particular hydrogen.

The aliphatic or aromatic bridging member B in the dye of the formula (1) is preferably a $C_2$–$C_{12}$alkylene radical, which may be interrupted by 1, 2 or 3 members from the group consisting of —NH—, —N(CH$_3$)— or —O—, a $C_5$–$C_9$cycloalkylene radical or phenylene radical which is unsubstituted or substituted by $C_1$–$C_4$alkyl, $C_1$–$C_4$alkoxy, $C_2$–$C_4$alkanoylamino, sulfo, halogen or carboxyl, or a radical of the formula

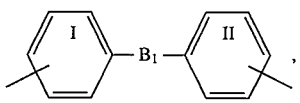

in which the benzene rings I and II are unsubstituted or substituted by $C_1$–$C_4$alkyl, $C_1$–$C_4$alkoxy, $C_2$–$C_4$alkanoylamino, sulfo, halogen or carboxyl and $B_1$ is a $C_2$–$C_{10}$ alkylene radical, which may be interrupted by 1, 2 or 3 oxygen atoms, or in which $B_1$ is a bridging member of the formula —CH=CH—, —N=N—, —NH—, —CO—, —NH—CO—, —NH—CO—NH—, —O—, —S— or —SO$_2$—, in particular —CH=CH— or —NH—CO—.

Particularly preferably, the bridging member B in the dye of the formula (1) is a radical of the formula

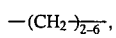

unsubstituted or $C_1$–$C_4$ alkyl-substituted cyclohexylene, unsubstituted or $C_1$–$C_4$alkyl-, $C_1$–$C_4$ alkoxy-, $C_2$–$C_4$alkanoylamino-, sulfo-, halogen- or carboxyl-substituted phenylene or a radical of the formula

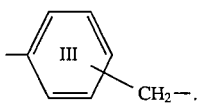

in which the benzene ring III is unsubstituted or substituted by $C_1$–$C_4$alkyl, $C_1$–$C_4$alkoxy, $C_2$–$C_4$alkanoylamino, sulfo, halogen or carboxyl.

The radicals $Y_1$ and $Y_2$ in the dye of the formula (1), independently of one another, are in particular fluorine or carboxypyridinium, preferably fluorine.

D in the dye of the formula (2) is, for example, the radical of an aminobenzene, aminonaphthalene, phenylazoaminobenzene, naphthylazoaminobenzene, phenylazoaminonaphthalene or naphthylazoaminonaphthalene, each of which can be unsubstituted or, preferably, substituted as shown below. D is preferably a substituted or unsubstituted radical of an aminobenzene or aminonaphthalene.

Examples of suitable substituents on the radical D are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, amino, N-mono- or N,N-di-$C_1$–$C_4$alkylamino, it being possible for the alkyl to be, if desired, further substituted by —OH, —OCOCH$_3$, —OSO$_3$H, —CN or halogen, for example methylamino, ethylamino, n- or iso-propylamino or n-, sec- or tert-butylamino, N,N-dimethyl- or diethylamino, β-chloroethylamino, β-cyanoethylamino, β-acetyloxyethylamino, N-(β-hydroxyethyl)-N-ethylamino, β-sulfatoethylamino, N,N-di-(β-hydroxyethyl)amino, N,N-di-(β-sulfatoethyl)amino or hydroxypropylamino, phenylamino, $C_1$–$C_4$alkanoylamino, in particular acetylamino or propionylamino, benzoylamino, $C_1$–$C_4$alkoxycarbonyl, for example methoxy- or ethoxycarbonyl, nitro, cyano, trifluoromethyl, halogen, for example fluorine, chlorine or bromine, hydroxyl, carboxyl, sulfo, sulfomethyl, sulfamoyl, N-mono- or N,N-di-$C_1$–$C_4$alkylsulfamoyl, N-phenylsulfamoyl, carbamoyl, N-mono- or N,N-di-$C_1$–$C_4$ alkylcarbamoyl, ureido, $C_1$–$C_4$alkylsulfonyl, for example methyl- or ethylsulfonyl. In addition, the radical D can be substituted by reactive groups. Examples of suitable reactive groups are the ones mentioned above as substituents of the radicals $A_1$ and $A_2$, to which the meanings and preferences given apply.

$R_5$ or $R_6$ in the dye of the formula (2) as a $C_1$–$C_6$alkyl radical is, for example, a methyl, ethyl, n- or iso-propyl, n-, sec- or tert-butyl or a straight-chain or branched pentyl or hexyl radical, it being possible for these radicals to be substituted, for example, by hydroxyl, sulfo, sulfato, carboxyl, cyano, halogen, $C_1$–$C_4$ alkoxycarbonyl, $C_1$–$C_4$alkanoyloxy, carbamoyl or a reactive radical and for the alkyl radical, with the exception of methyl, to be, if desired, interrupted by —O— or —NR'—, R' being hydrogen or $C_1$–$C_4$alkyl.

In the case where the alkyl radical $R_5$ or $R_6$ is substituted by a reactive group, the reactive group can be one of the abovementioned reactive groups. Preferably, the radical has the formula —SO$_2$—Z, in which Z has the abovementioned meanings and preferences.

Preferably, $R_5$ and $R_6$ as alkyl radical are, independently of one another, hydrogen or a $C_1$–$C_4$alkyl radical which is unsubstituted or substituted by hydroxyl, sulfo, sulfato, carboxyl, cyano or the group —SO$_2$—Z and, if desired, interrupted by —O—; one of the radicals $R_5$ and $R_6$ is preferably hydrogen.

Examples of particularly preferred non-reactive alkylamino radicals $V_1$ and $V_2$ are: —NH—CH$_3$, —NH—CH$_2$—SO$_3$H, —NH—CH$_2$—COOH, —NH—C$_2$H$_5$, —NH—CH$_2$ —CH$_2$—OH, —NH—CH$_2$—CH$_2$—SO$_3$H, —NH—CH$_2$ —CH$_2$—OSO$_3$H, —NH—CH$_2$—CH$_2$—CN, —NH—CH$_2$—CH$_2$—COOH, —NH—CH$_2$—CH$_2$—CH$_2$—OSO$_3$H, —NH—CH$_2$—CH $_2$CH$_2$—OH, —NH—

$CH_2$—$CH(OH)$—$CH_2$—$CH_3$, —NH—$CH_2$—$CH_2$—O—$CH_2$—$CH_2$—OH, —NH—$CH_2$—$CH_2$—O—$CH_2$—$CH_2$—$OSO_3H$.

In the case where $R_5$ and $R_6$ together with the nitrogen atom linking them form a heterocyclic radical, this radical can be, for example, a piperidinyl, piperazinyl or pyrrolidinyl radical, each of which is unsubstituted or substituted, for example, by a radical of the formula —(alk)$_p$—$SO_2$—Z, in which alk is $C_1$–$C_6$alkylene, p is the number 0 or 1 and Z has the abovementioned meanings and preferences.

$R_5$ and $R_6$ as an aryl radical can be, for example, a phenyl or naphthyl radical which is unsubstituted or substituted, for example, by sulfo, carboxyl, $C_1$–$C_4$alkyl, $C_1$–$C_4$alkoxy, halogen, a reactive radical or a group –N=N—K, K being the radical of a coupling component from the benzene or naphthalene series or the heterocyclic series.

In this case, K is preferably the radical of a benzene, naphthalene, 1-phenyl-5-pyrazolone or pyridone substituted, for example, by one or more identical or different substituents of the ones mentioned above for D.

Particularly preferably, K has one of the formulae listed below:

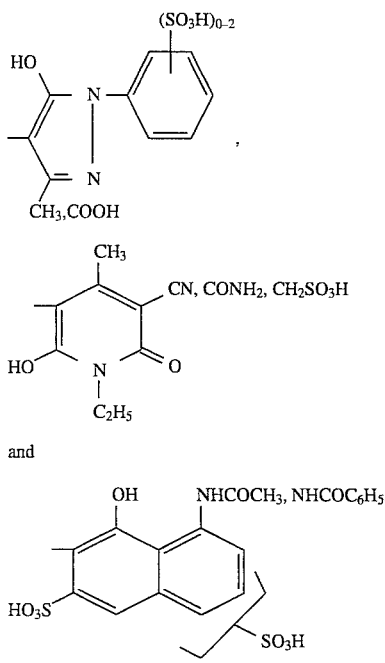

and

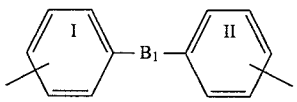

Particularly preferably, $R_5$ and $R_6$ in the dye of the formula (2) are, independently of one another, hydrogen or a phenyl or naphthyl radical which is unsubstituted or substituted by sulfo, carboxyl, $C_1$–$C_4$alkyl, $C_1$–$C_4$ alkoxy, halogen, a reactive radical or a group —N=N—K, in which K is the radical of a coupling component from the benzene or naphthalene series or the heterocyclic series, or are a $C_1$–$C_6$alkyl radical which is unsubstituted or substituted by hydroxyl, sulfo, sulfato, carboxyl, cyano, halogen, $C_1$–$C_4$alkoxycarbonyl, $C_1$–$C_4$alkanoyloxy, carbamoyl or a reactive radical of the formula —$SO_2$—Z, in which Z has the abovementioned meanings and preferences and alkyl, with the exception of methyl, is, if desired, interrupted by —O— or —NR'—, R' being hydrogen or $C_1$–$C_4$alkyl, or $R_5$ and $R_6$, together with the N atom, form a piperidinyl, piperazinyl or pyrrolidinyl radical which is unsubstituted or substituted by a radical of the formula —(alk)$_p$—$SO_2$—Z, in which alk is $C_1$–$C_6$alkylene, p is the number 0 or 1 and Z has the abovementioned meanings and preferences.

The abovementioned meanings and preferences also apply to K and the reactive group mentioned as substituent of the phenyl and naphthyl radicals.

Very particularly preferably, $V_1$ and $V_2$ in the dye of the formula (2) are a radical of the formula (3), in which $R_5$ and $R_6$, independently of one another, are hydrogen or a $C_1$–$C_6$alkyl radical which is unsubstituted or substituted by hydroxyl, sulfo, sulfato, carboxyl, cyano or the group —$SO_2$—Z, in which alkyl, with the exception of methyl, is, if desired, interrupted by —O— or —NR'— and Z has the abovementioned meanings and preferences, or are phenyl or naphthyl which is unsubstituted or substituted by $C_1$–$C_4$alkyl, $C_1$–$C_4$alkoxy, $C_2$–$C_4$alkanoylamino, sulfo, halogen or carboxyl. In particular, at least one of the radicals $V_1$ and $V_2$ contains a group —$SO_2$—Z.

Q in the dye of the formula (2) is preferably unsubstituted or $C_1$–$C_4$alkyl-, $C_1$–$C_4$alkoxy-, $C_2$–$C_4$alkanoylamino-, $C_1$–$C_4$ alkoxycarbonyl-, $C_1$–$C_4$alkylsulfonyl-, halogen-, sulfo-, trifluoromethyl-, nitro- or cyano-substituted phenyl, 1- or 2-naphthyl or furanyl, thienyl or benzothiazolyl.

Particularly preferably, Q in the dye of the formula (2) is phenyl which is unsubstituted or substituted by methyl, trifluoromethyl, methoxy, sulfo, nitro, chlorine or bromine, in particular unsubstituted phenyl.

Dyes of the formula (2) containing, in the radical $V_1$, $V_2$ or D, at least one reactive group of the formula (4), (4a), (4b), (4c), (4d), (4e) or (5), T in the radical of the formula (5) being a group of the formula (6a), (6b), (6 c), (6d) or (6e), are preferred for the process according to the invention.

Very particularly preferred dyes of the formula (2) are those containing, in the radical $V_1$, $V_2$ or D, in particular in the radical $V_1$ or $V_2$, at least one reactive group of the formula (4).

In a preferred embodiment of the process according to the invention, the dye used is one of the formula (1) in which $A_1$ and $A_2$, independently of one another, are the radical of a monoazo, disazo or formazan dye, B is a $C_2$–$C_{12}$alkylene radical, which may be interrupted by 1, 2 or 3 members from the group consisting of —NH—, —N($CH_3$)— or —O—, a $C_5$–$C_9$cycloalkyl radical or phenylene radical which is unsubstituted or substituted by $C_1$–$C_4$alkyl, $C_1$–$C_4$alkoxy, $C_2$–$C_4$alkanoylamino, sulfo, halogen or carboxyl or a radical of the formula in which the benzene rings I and II are unsubstituted or substituted by $C_1$–$C_4$alkyl, $C_1$–$C_4$alkoxy, $C_2$–$C_4$alkanoylamino, sulfo, halogen or carboxyl and $B_1$ is a $C_2$–$C_{10}$ alkylene radical, which may be interrupted by 1, 2 or 3 oxygen atoms, or $B_1$ is a bridging member of the formula —CH=CH—, —N=N—, —NH—, —CO—, —NH—CO—, —NH—CO—NH—, —O—, —S— or $R_1$, $R_2$, $R_3$ and $R_4$, independently of one another, are hydrogen, methyl or ethyl, and $Y_1$ and $Y_2$, independently of one another, are fluorine or carboxypyridinium, or is a dye of the formula (2) in which D is the radical of a substituted or unsubstituted aminobenzene, aminonaphthalene, phenylazoaminobenzene, naphthylazoaminobenzene, phenylazoaminonaphthalene or naphthylazoaminonaphthalene, Q is unsubstituted or $C_1$–$C_4$alkyl-, $C_1$–$C_4$alkoxy-, $C_2$–$C_4$alkanoylamino-, $C_1$–$C_4$alkoxycarbonyl-, $C_1$–$C_4$ alkylsulfonyl-, halogen-, sulfo-, trifluoromethyl-, nitro or cyano-substituted phenyl, 1- or 2-naphthyl or furanyl, thienyl or benzothiazolyl, and $V_1$ and $V_2$ are a radical of the formula (3), in which $R_5$ and $R_6$, independently of one another, are hydrogen, phenyl or naphthyl which is unsubstituted or substituted by $C_1$-$C_4$alkyl, $C_1$-$C_4$alkoxy, $C_2$-$C_4$alkanoylamino, sulfo, halogen or carboxyl or are a $C_1$-$C_6$alkyl radical which is unsubstituted or substituted by hydroxyl, sulfo, sulfato, carboxyl, cyano or the group —$SO_2$—Z, in which alkyl, with the exception of methyl, is, if desired, interrupted by —O— or —NR'—, R' being hydrogen or $C_1$-$C_4$alkyl, Z is a radical of the formula —CH=$CH_2$ or —$CH_2$—$CH_2$—Y and Y is a group of the formula —Cl, —$OSO_3H$, —$SSO_3H$, —OCO—$CH_3$, —OCO—$C_6H_5$ or —$OPO_3$ $H_2$, with the proviso that at least one of the radicals $V_1$ and $V_2$ contains a group —$SO_2$—Z.

The radicals $A_1$ and $A_2$ in the dye of the formula (1) and the radical D in the dye of the formula (2) in particular do not contain a reactive group.

In a very particularly preferred embodiment of the process according to the invention, the dye used is a dye of the formula (1) to which the abovementioned meanings and preferences apply.

The dyes of the formulae (1) and (2) are either in the form of the free acid or, preferably, salts thereof, for example alkali metal salts, alkaline earth metal salts or ammonium salts or as salts of an organic mine. Examples which may be mentioned are the sodium salts, potassium salts, lithium salts or ammonium salts or the salt of triethanolamine.

The dyes of the formulae (1) and (2) are known or can be prepared in analogy to known dyes. Thus, dyes of the formula (1) are disclosed, for example, in GB-A-1 529 645 and dyes of the formula (2) are disclosed, for example, in EP-A- 298 041 or can be prepared analogously thereto.

Salts of mineral acids are understood to mean, for example, alkali metal halides or alkaline earth metal halides and alkali metal sulfates or alkaline earth metal sulfates, for example lithium chloride, sodium chloride or potassium chloride and lithium sulfate, sodium sulfate or potassium sulfate. The salts of mineral acids are preferably alkali metal chlorides or alkali metal sulfates, in particular sodium chloride or sodium sulfate.

In an important embodiment of the process according to the invention for the dyeing of cellulose-containing fibre materials, dyeing is carried out in the presence of the salt of a mineral acid in an amount depending on the total amount of the dye used. Thus, in the case of light-coloured shades, the amount of the salt of a mineral acid used is 0 to 5 g, in particular 0.01 to 5 g, per liter of dyebath in the case of medium shades, the amount is 5 to 10 g and, in the case of deep shades, the amount is 10 to 20 g. Light-coloured shades are understood to mean those in which the amount of the dye used for dyeing is less than 1 per cent by weight, relative to the weight of the material to be dyed. Medium shades are those in which the amount of the dye used is 1 to 3 per cent by weight and deep shades are those in which the amount of the dye used is more than 3 per cent by weight, in particular more than 3 per cent by weight and up to 10 per cent by weight.

However, it is also possible to omit the addition of a salt of a mineral acid, such as an alkali metal halide or alkali metal sulfate, entirely, which has proved advantageous in particular in the case where dyeing produces light-coloured shades.

In a particularly preferred embodiment of the process according to the invention, dyeing is carried out in the presence of the salt of a mineral acid in an amount of 0 to 10 g per liter of dyebath, in particular 0.01 to 10 g. In this embodiment, too, dyeing can be carried out in the presence of the salt of a mineral acid in an amount depending on the total amount of the dye used. Thus, in the case of light-coloured shades, the amount of the salt of a mineral acid used can be 0 to 5 g, in particular 0.01 to 5 g, per liter of dyebath and, in the case of deeper shades, the mount can be 5 to 10 g. The light-coloured shades are as defined above and the deeper shades correspond to mounts of the dye used of 1 per cent by weight or more, in particular 1 per cent by weight to 10 per cent by weight, preferably 1 per cent by weight to 6 per cent by weight.

Examples of suitable fibre materials are natural cellulose fibres, such as cotton, linen and hemp, cellulose itself and regenerated cellulose, in particular cotton. The fibre materials can be present in a variety of processing states, for example as fibre, yarn, woven fabric or knitted fabric.

For the process according to the invention, the amounts in which the reactive dyes are used in the dyeing baths can vary, depending on the desired colour depth, the amounts which have proven advantageous being in general 0.01 to 10 per cent by weight, in particular 0.01 to 6 per cent by weight, relative to the material to be dyed.

The dye liquors can contain the commonly used additives, for example aqueous solutions of alkali metal hydroxides, urea, thickeners, for example alginate thickeners, water-soluble cellulose alkyl ethers, methylcellulose, starch ethers, emulsion thickeners, preferably an alginate, for example sodium alginate, and dispersing aids, levelling aids, wetting agents, migration-inhibiting auxiliaries and sodium m-nitrobenzenesulfonate.

The preferred method for the process according to the invention for the dyeing of cellulose-containing fibre materials is dyeing by the exhaust method. This type of dyeing is usually carried out in aqueous medium at a liquor ratio of, for example, 2:1 to 60:1, in particular at a liquor ratio of 5:1 to 20:1.

Dyeing is carried out, for example, at a temperature of 20° to 100° C., in particular 40° to 90° C., and preferably 60° to 80° C.

In accordance with the process of this invention, the addition of fairly large amounts of salts of a mineral acid, for example 50 to 100 g/l, which is a common practice in dyeing, can be omitted. This reduces waste water pollution and achieves greater economy of the process.

The present invention, apart from relating to a process for the dyeing of cellulose-containing fibre materials, also relates, as mentioned above, to the dyeing of blends of cellulose fibre materials with polyester.

Suitable disperse dyes for the process according to the invention for the dyeing of fibre blends are the customary disperse dyes, for example the dyes mentioned in Colour Index, 3rd Edition (1971) Volume 2 on pages 2479 to 2742.

Examples of suitable cellulose fibre materials are natural cellulose fibres, such as cotton, linen and hemp, cellulose itself and regenerated cellulose. Particular preference is given to the dyeing of polyester/cotton blend fabrics.

The process according to the invention for the dyeing of fibre blends is suitable in particular for the exhaust method, in particular for a one-step, single-bath exhaust method. Dyeing is preferably carried out in this case at a temperature of 90° to 140° C., in particular 100° to 130° C., and preferably 110° to 130° C. The pH is preferably in a range from 6 to 10, in particular in a range from 6 to 8.

In a very particularly preferred embodiment of the process according to the invention for the dyeing of fibre blends, polyester/cotton blend fabrics are dyed at a temperature of 90° to 140° C. and a pH of 6 to 10 in a one-step, single-bath exhaust method.

In an important embodiment of the process according to the invention for the dyeing of fibre blends, dyeing is carried out in the presence of the salt of a mineral acid in an amount of 0 to 30 g per liter of dyebath, in particular 0 to 20 g.

In the process according to the invention for the dyeing of fibre blends, the reactive dyes of the formulae (1) and (2) have the abovementioned meanings and preferences. The possible additives and liquor ratio for the dye liquors correspond to those listed above for the process for the dyeing of cellulose-containing fibre materials. For the salts of a mineral acid, the abovementioned meanings and preferences apply.

In accordance with the process of this invention, the otherwise customary addition of fairly large amounts of alkali metal hydroxides for fixing the reactive dye can be omitted. Likewise, it is possible to use smaller amounts of salts of a mineral acid. This reduces waste water pollution and enables a simpler treatment of the fabric after the dyeing process.

The reactive dyes used in accordance with the process of this invention are distinguished by good fixation properties, very good build-up properties and a high degree of exhaustion.

In accordance with the process of this invention for the dyeing of blend fabrics of cellulose fibre materials with polyester fibres, the different fibre materials of the blend fabric can be dyed in the same hue. Both the process according to the invention for the dyeing of blend fabrics and the process according to the invention for the dyeing of cellulose-containing fibre materials produce level dyeings having a high colour strength and a high stability of the fibre-to-dye bond, not only in the acidic but also in the alkaline range and furthermore have good light fastness and very good wet fastness properties, such as wash, water, seawater, crossdyeing and perspiration fastness properties, and good pleating fastness and hot press fastness.

The examples which follow serve to illustrate the invention. Temperatures are given in degrees Celcius, and parts and per centages are by weight, unless stated otherwise. Parts by weight relate to parts by volume as the kilogram relates to the liter.

Example 1

2 parts of a yellow-dyeing reactive dye of the formula

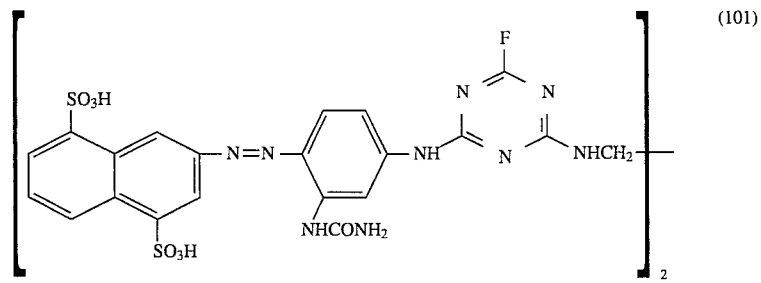

1 part of a red-dyeing reactive dye of the formula

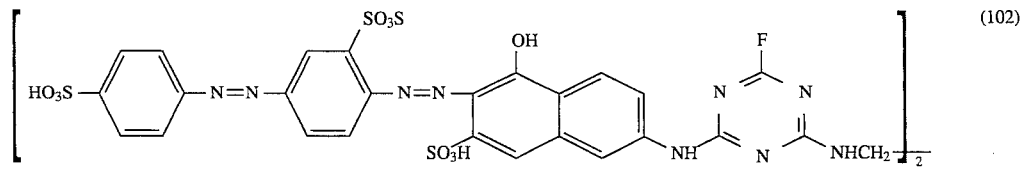

and 0.5 part of a blue-dyeing reactive dye of the formula

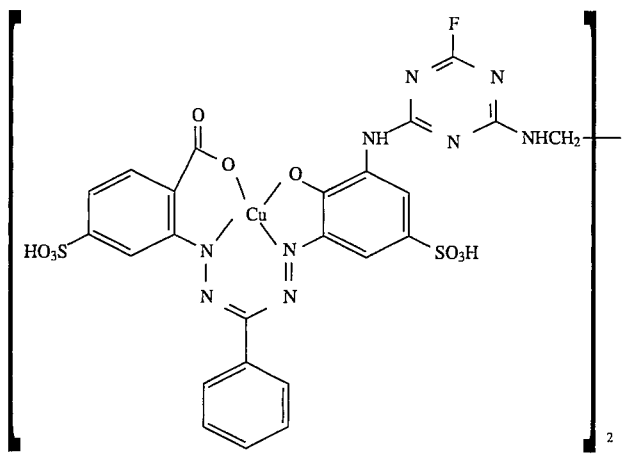

(103)

are dissolved in 1000 parts of water at a temperature of about 70° C. with the addition of 10 parts of sodium chloride. The dyebath thus produced is entered with 100 parts of a cotton fabric, and the temperature is maintained at 70° C. for about 50 minutes. 10 parts of calcined sodium carbonate and 3 parts of 30% sodium hydroxide are then added. The temperature is maintained at 70° C. for another 50 minutes. The liquor is then discharged, the dyed cotton fabric is soaped for 15 minutes using a 0.1% boiling solution of a detergent, then rinsed and dried, giving a cotton fabric dyed in a brown hue and having good fastness properties.

Examples 2 to 40

The procedure of Example 1 is repeated, except that an equimolar amount of a reactive dye of the formula

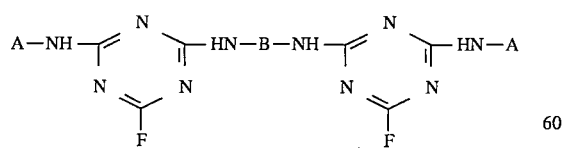

in which A is as defined in column 2 of Table 1 below and B is as defined in column 3, is used instead of 2 parts of the reactive dye of the formula (101), likewise giving a cotton fabric dyed in a brown hue.

TABLE 1

| Ex. | A | B |
|---|---|---|
| 2 | 1-hydroxy-2-(2-sulfophenylazo)-6-methyl-naphthalene-3-sulfonic acid | —CH₂CH₂— |
| 3 | " | —(CH₂)₆— |
| 4 | " | —(CH₂)₃—O—(CH₂)₄—O—(CH₂)₃— |
| 5 | 4-sulfophenylazo-(2-sulfo)-phenylazo-(4-ureido)-toluene | —CH₂CH₂— |
| 6 | " | —(CH₂)₃— |
| 7 | 4-sulfophenylazo-(2-sulfo)-phenylazo-(4-methylureido)-toluene | —CH₂CH₂— |
| 8 | " | —(CH₂)₃— |
| 9 | 5,8-disulfo-2-naphthylazo-(4-acetamido)-toluene | —CH₂CH₂— |
| 10 | 3,6,8-trisulfo-2-naphthylazo-(4-ureido)-toluene | —CH₂CH₂— |
| 11 | " | —(CH₂)₃— |
| 12 | 5,8-disulfo-2-naphthylazo-(4-ureido)-toluene | —(CH₂)₃—O—(CH₂)₄—O—(CH₂)₃— |
| 13 | " | —(CH₂)₂—O—(CH₂)₂— |
| 14 | " | —(CH₂)₃—O—(CH₂)₂—O—(CH₂)₂—O—(CH₂)₃— |
| 15 | " | —(CH₂)₃— |
| 16 | " | —(CH₂)₆— |
| 17 | " | *para-phenylene* |
| 18 | " | *methyl-para-phenylene* |

Note: The structures in column A are shown as chemical diagrams in the original. Key structures:

- Ex. 2: 2-sulfophenyl-azo-(1-hydroxy-3-sulfo-6-methyl-naphthyl)
- Ex. 5, 6: HO₃S—C₆H₄—N=N—(2-SO₃H-C₆H₃)—N=N—(4-NHCONH₂-toluene)
- Ex. 7, 8: HO₃S—C₆H₄—N=N—(2-SO₃H-C₆H₃)—N=N—(4-NHCONH₃-toluene)
- Ex. 9: 1,4-disulfo-naphthyl-(5,8-SO₃H)—N=N—(4-NHCOCH₃-toluene)
- Ex. 10, 11: (1,5,7-trisulfonaphthyl)—N=N—(4-NHCONH₂-toluene)
- Ex. 12–18: (5,8-disulfonaphthyl)—N=N—(4-NHCONH₂-toluene)
- Ex. 17: B = 1,4-phenylene
- Ex. 18: B = 2-methyl-1,4-phenylene TABLE 1-continued

| Ex. | A | B |
|---|---|---|
| 19 | " | −N(piperazine)N− |
| 20 | " | −N(piperazine)N−(CH₂)₂− |
| 21 | " | 2-sulfo-phenyl−CH=CH−2-sulfo-phenyl (with HO₃S groups) |
| 22 | " | 2-sulfo-phenyl−CONH−3-sulfo-phenyl |
| 23 | 7-[(4-methyl-2-ureido-phenyl)azo]-naphthalene-1,3-disulfonic acid (SO₃H at 1,3; NHCONH₂ on aniline) | −CH₂CH₂− |
| 24 | 7-[(5-methoxy-2-methyl-phenyl)azo]-naphthalene-1,5-disulfonic acid | −CH₂CH₂− |
| 25 | 2-[(1-hydroxy-6-methyl-3-sulfo-2-naphthyl)azo]-naphthalene-1,5-disulfonic acid | −CH₂CH₂− |
| 26 | 4-sulfophenyl−N=N−(2-sulfo-phenylene)−N=N−(5-methoxy-2-methyl-phenyl) | −CH₂CH₂− |
| 27 | " | −(CH₂)₃−O−(CH₂)₄−O−(CH₂)₃− |
| 28 | 1-ethyl-3-carbamoyl-4-methyl-6-hydroxy-5-[(4-methyl-2-sulfo-phenyl)azo]-2-pyridone | −CH₂CH₂− |

TABLE 1-continued
| Ex. | A | B |
|---|---|---|
| 29 | 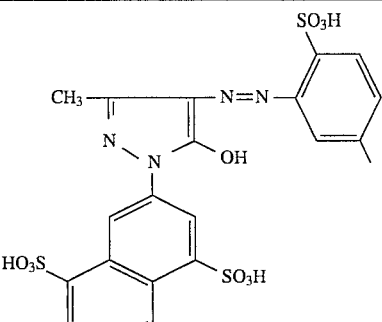 | —CH$_2$CH$_2$— |
| 30 | 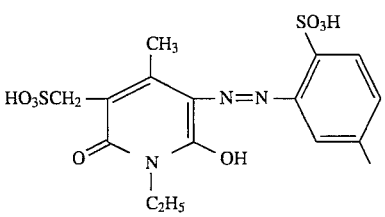 | —CH$_2$CH$_2$— |
| 31 | 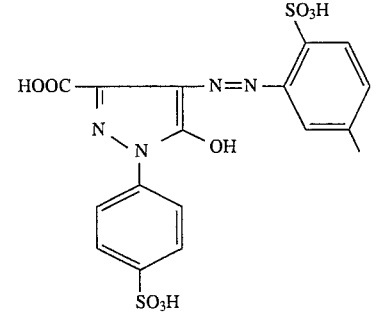 | —CH$_2$CH$_2$— |
| 32 | 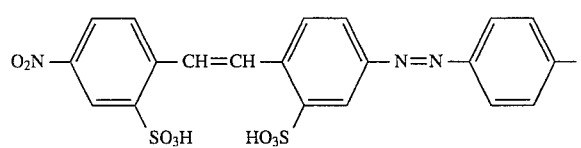 | —CH$_2$CH$_2$— |
| 33 | 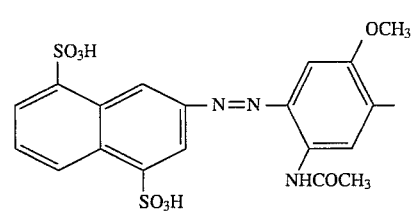 | —CH$_2$CH$_2$— |
| 34 | 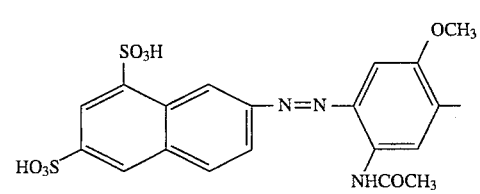 | —CH$_2$CH$_2$— |
| 35 | 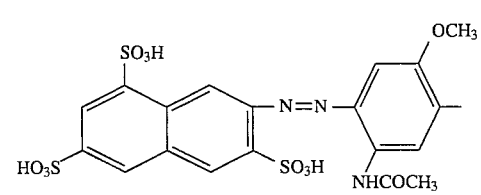 | —CH$_2$CH$_2$— |

TABLE 1-continued

| Ex. | A | B |
|---|---|---|
| 36 | (naphthalene with SO$_3$H, HO$_3$S, SO$_3$H)—N=N—(phenyl with OCH$_3$, NHCOCH$_3$) | —CH$_2$CH$_2$— |
| 37 | (naphthalene with SO$_3$H, SO$_3$H)—N=N—(phenyl with OCH$_2$CH$_2$OH, CH$_3$) | —CH$_2$CH$_2$— |
| 38 | (naphthalene with SO$_3$H, HO$_3$S, SO$_3$H)—N=N—(phenyl with OCH$_2$CH$_2$OH, CH$_3$) | —CH$_2$CH$_2$— |
| 39 | (naphthalene with SO$_3$H, HO$_3$S)—N=N—(phenyl with OCH$_2$CH$_2$OH, CH$_3$) | —CH$_2$CH$_2$— |
| 40 | (naphthalene with SO$_3$H, HO$_3$S, SO$_3$H)—N=N—(phenyl with OCH$_2$CH$_2$OH, CH$_3$) | —CH$_2$CH$_2$— |

The procedure given in one of Examples 1 to 40 is repeated, except that a reactive dye in which B is a bridge member of the formula

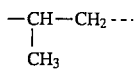

and A is as defined is used instead of the reactive dye of the formula (101), likewise giving a cotton fabric dyed in a brown hue.

The procedure given in one of Examples 1 to 40 is repeated, except that a reactive dye in which B is a bridge member of the formula

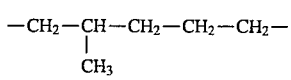

and A is as defined is used instead of the reactive dye of the formula (101), likewise giving a cotton fabric dyed in a brown hue.

The procedure given in one of Examples 1 to 40 is repeated, except that a reactive dye in which B is a bridge member of the formula

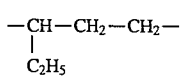

and A is as defined is used instead of the reactive dye of the formula (101), likewise giving a cotton fabric dyed in a brown hue:

Examples 41 to 57

The procedure given in Example 1 is repeated, except that an equimolar amount of one of the reactive dyes listed in column 2 of Table 2 below is used instead of 2 parts of the reactive dye of the formula (101), likewise giving a cotton fabric dyed in a brown hue.

TABLE 2

| Ex. | Reactive dye |
|---|---|
| 41 | Pyrimidine with phenyl at C2; C4-NH-(CH$_2$)$_2$-SO$_2$-(CH$_2$)$_2$-OSO$_3$H; C5-N=N-(3-SO$_3$H-phenyl); C6-NH-(CH$_2$)$_2$-OSO$_3$H |
| 42 | Pyrimidine with phenyl at C2; C4-NH-(CH$_2$)$_2$-SO$_2$-(CH$_2$)$_2$-OSO$_3$H; C6-NH-(CH$_2$)$_2$-OSO$_3$H; C5-N=N-[2-(HO$_3$S)-4-(NH-C(=N-C(Cl)=N-)-NH-(CH$_2$)$_2$-SO$_2$-CH=CH$_2$)-triazinyl-phenyl] |
| 43 | Pyrimidine with phenyl at C2; C4-NH-(CH$_2$)$_2$-SO$_2$-(CH$_2$)$_2$-OSO$_3$H; C6-NH-CH$_3$; C5-N=N-[2-(HO$_3$S)-5-(NH-C(=N-C(F)=N-)-NH-(3-SO$_3$H-phenyl))-phenyl] |
| 44 | Pyrimidine with phenyl at C2; C4-NH-(CH$_2$)$_2$-SO$_2$-(CH$_2$)$_2$-OSO$_3$H; C6-NH$_2$; C5-N=N-(1,5-disulfonaphth-2-yl) |
| 45 | Pyrimidine with phenyl at C2; C4-NH-(CH$_2$)$_2$-SO$_2$-(CH$_2$)$_2$-OSO$_3$H; C6-NH-(CH$_2$)$_2$-SO$_2$-(CH$_2$)$_2$-OSO$_3$H; C5-N=N-(2-HO$_3$S-4-SO$_3$H-phenyl) |
| 46 | Pyrimidine with phenyl at C2; C4-NH-(4-SO$_2$-(CH$_2$)$_2$-OSO$_3$H-phenyl); C6-NH-(CH$_2$)$_2$-O-(CH$_2$)$_2$-SO$_2$-(CH$_2$)$_2$-OSO$_3$H; C5-N=N-(1,5-disulfonaphth-2-yl) |

TABLE 2-continued
| Ex. | Reactive dye |
|---|---|
| 47 | 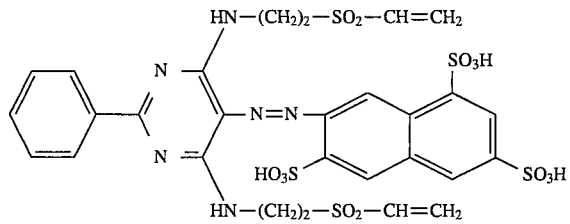 |
| 48 | 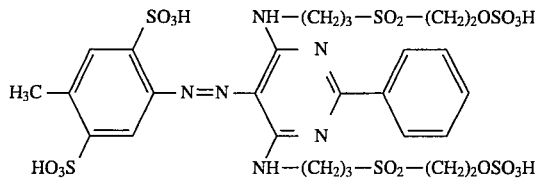 |
| 49 | 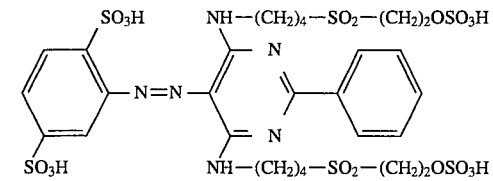 |
| 50 | 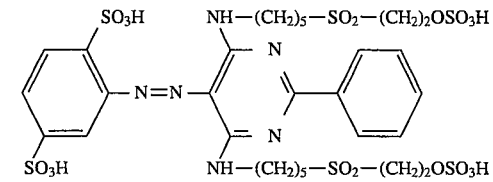 |
| 51 | 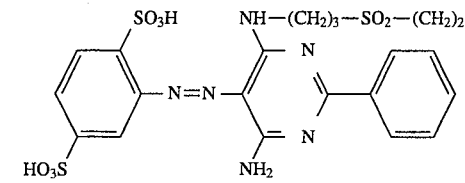 |
| 52 | 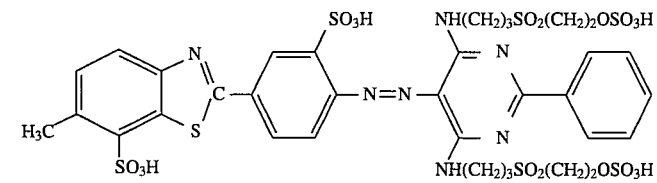 |
| 53 | 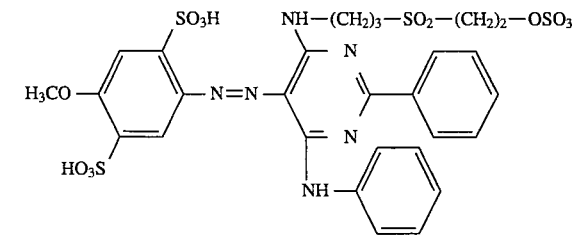 |
| 54 | 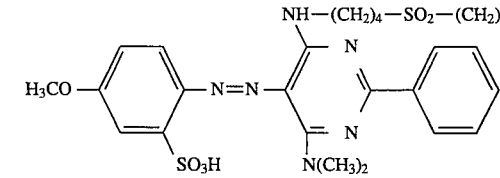 |

TABLE 2-continued

| Ex. | Reactive dye |
|---|---|
| 55 | (naphthalene with two SO₃H groups)-N=N-(pyrimidine with NH-(CH₂)₂-SO₂-(CH₂)₂-OSO₃H, NH-(CH₂)₂-OH, and phenyl substituents) |
| 56 | (naphthalene with two SO₃H groups)-N=N-(pyrimidine with NH(CH₂)₂SO₂(CH₂)₂OSO₃H, NHCH₃, and phenyl substituents) |
| 57 | (phenyl with SO₃H)-N=N-(pyrimidine with two NH-(CH₂)₃-SO₂-(CH₂)₂-OSO₃H groups and phenyl substituent) |

Examples 58 to 83

The procedure given in Example 1 is repeated, except that an equimolar amount of a reactive dye of the formula

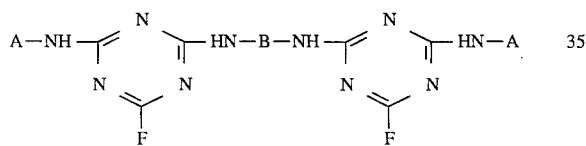

in which A is as defined in column 2 of Table 3 below and B is as defined in column 3, is used instead of one part of the reactive dye of the formula (102), likewise giving a cotton fabric dyed in a brown hue.

TABLE 3

| Ex. | A | B |
|---|---|---|
| 58 | (benzene with SO₃H, OCH₃, SO₃H)-N=N-(naphthalene with OH, SO₃H) | —CH₂CH₂— |
| 59 | (benzene with SO₃H, CH₃)-N=N-(naphthalene with OH, SO₃H) | —CH₂CH₂— |
| 60 | " | —(CH₂)₃—O—(CH₂)₄—O—(CH₂)₃— |
| 61 | " | —(CH₂)₃— |
| 62 | " | —(CH₂)₆— |

TABLE 3-continued

| Ex. | A | B |
|---|---|---|
| 63 | [2-hydroxy-3-((4-methoxy-2-sulfophenyl)azo)-6-methylnaphthalene-3-sulfonic acid structure with SO₃H, H₃CO on benzene; OH, SO₃H, CH₃ on naphthalene] | $-CH_2CH_2-$ |
| 64 | " | $-(CH_2)_2-O-(CH_2)_2-$ |
| 65 | " | $-(CH_2)_3-O-(CH_2)_2-O-(CH_2)_2-O-(CH_2)_3-$ |
| 66 | " | $-(CH_2)_3-$ |
| 67 | " | $-(CH_2)_6-$ |
| 68 | " | [1,4-phenylene] |
| 69 | " | [2-methyl-1,4-phenylene with H₃C] |
| 70 | " | $-N$[piperazine]$N-$ |
| 71 | " | $-N$[piperazine]$N-(CH_2)_2-$ |
| 72 | " | [stilbene-2,2'-disulfonic acid diyl: two phenyl rings connected by CH=CH, each with SO₃H] |
| 73 | " | [benzamide linkage: phenyl-SO₃H-CONH-phenyl-SO₃H] |
| 74 | [2-((4-methyl-2,5-disulfophenyl)azo)-1-hydroxy-6-methylnaphthalene-3-sulfonic acid] | $-CH_2CH_2-$ |
| 75 | " | $-(CH_2)_6-$ |
| 76 | [2-((4-methyl-2,5-disulfophenyl)azo)-1-hydroxy-8-methylnaphthalene-3,6-disulfonic acid] | $-CH_2CH_2-$ |

TABLE 3-continued

| Ex. | A | B |
|---|---|---|
| 77 | (structure: 2,5-disulfophenyl-N=N-[1-hydroxy-3-sulfo-6-sulfo-naphthalene]) | —CH₂CH₂— |
| 78 | (structure: 1-sulfo-5-sulfo-naphthalen-2-yl-N=N-[1-hydroxy-3-sulfo-6-sulfo-naphthalene]) | —CH₂CH₂— |
| 79 | (structure: 1-sulfo-naphthalen-2-yl-N=N-[1-hydroxy-3-sulfo-6-sulfo-naphthalene]) | —CH₂CH₂— |
| 80 | (structure: 2-sulfo-4-methyl-phenyl-N=N-[1-hydroxy-3-sulfo-6-sulfo-naphthalene]) | —CH₂CH₂— |
| 81 | (structure: 2-sulfophenyl-N=N-[1-hydroxy-3-sulfo-6-sulfo-naphthalene]) | —CH₂CH₂— |
| 82 | (structure: 2-sulfophenyl-N=N-[1-hydroxy-3-sulfo-6-sulfo-8-(NHCO-phenyl)-naphthalene]) | —CH₂CH₂— |
| 83 | (structure: 1-sulfo-5-sulfo-naphthalen-2-yl-N=N-[1-hydroxy-3-sulfo-6-sulfo-8-(NHCO-phenyl)-naphthalene]) | —CH₂CH₂— |

The procedure given in one of Examples 58 to 83 is repeated, except that a reactive dye in which B is a bridge member of the formula

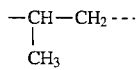

and A is as defined is used instead of the reactive dye of the formula (102), likewise giving a cotton fabric dyed in a brown hue.

The procedure given in one of Examples 58 to 83 is repeated, except that a reactive dye in which B is a bridge member of the formula

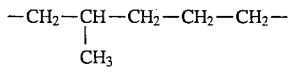

and A is as defined is used instead of the reactive dye of the formula (102), likewise giving a cotton fabric dyed in a brown hue.

The procedure given in one of Examples 58 to 83 is repeated, except that a reactive dye in which B is a bridge member of the formula

—CH—CH$_2$—CH$_2$—
|
C$_2$H$_5$ and A is as defined is used instead of the reactive dye of the formula (102), likewise giving a cotton fabric dyed in a brown hue.

Examples 84 to 106

The procedure given in Example 1 is repeated, except that an equimolar amount of a reactive dye of the formula

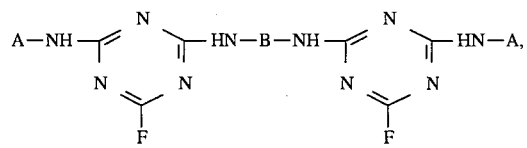

in which A is as defined in column 2 of Table 4 below and B is as defined in column 3, is used instead of 0.5 part of the reactive dye of the formula (103), likewise giving a cotton fabric dyed in a brown hue.

TABLE 4

| Ex. | A | B |
|---|---|---|
| 84 | (Cu complex azo dye with COO, SO$_3$H, SO$_3$H substituents and phenyl group) | —CH$_2$CH$_2$— |
| 85 | (disazo dye: SO$_3$H-phenyl-N=N-naphthalene(H$_2$N,OH,HO$_3$S,SO$_3$H)-N=N-phenyl-SO$_3$H) | —CH$_2$CH$_2$— |
| 86 | " | —(CH$_2$)$_2$—O—(CH$_2$)$_2$— |
| 87 | " | —(CH$_2$)$_3$—O—(CH$_2$)$_2$—O—(CH$_2$)$_2$—O—(CH$_2$)$_3$— |
| 88 | " | —(CH$_2$)$_3$— |
| 89 | " | —(CH$_2$)$_6$— |
| 90 | " | —C$_6$H$_4$— (para-phenylene) |
| 91 | " | (3-methyl-phenylene) |
| 92 | " | —N(piperazine)N— |
| 93 | " | —N(piperazine)N—(CH$_2$)$_2$— |

TABLE 4-continued
| Ex. | A | B |
|---|---|---|
| 94 | " | 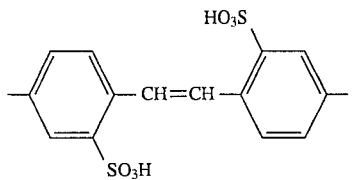 |
| 95 | " | 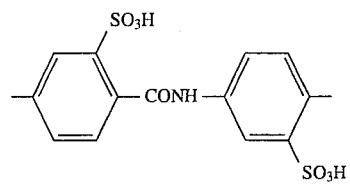 |
| 96 | 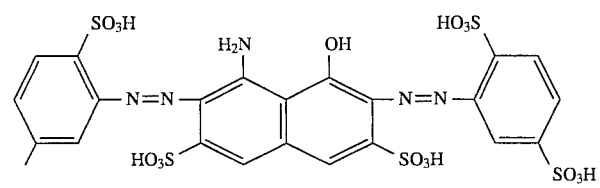 | —CH$_2$CH$_2$— |
| 97 | " | —(CH$_2$)$_6$— |
| 98 | 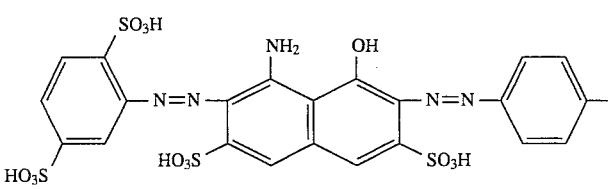 | —CH$_2$CH$_2$— |
| 99 | 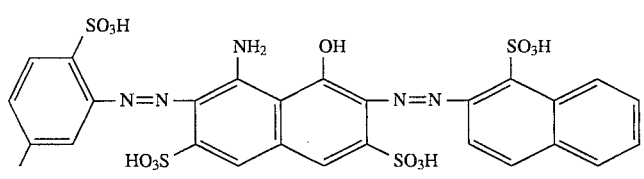 | —CH$_2$CH$_2$— |
| 100 | 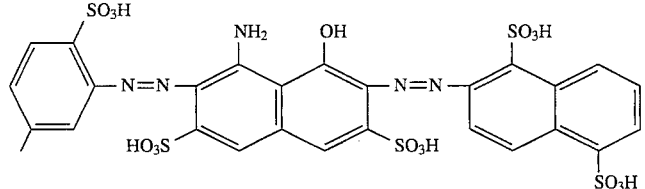 | —CH$_2$CH$_2$— |
| 101 | 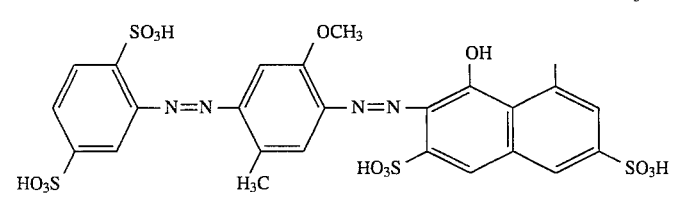 | —CH$_2$CH$_2$— |
| 102 | 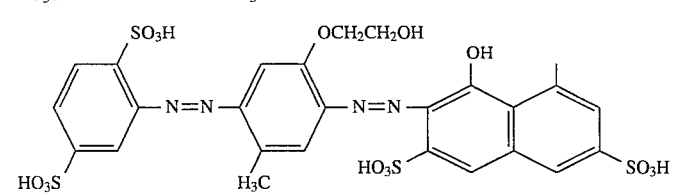 | —CH$_2$CH$_2$— |

TABLE 4-continued

| Ex. | A | B |
|---|---|---|
| 103 |  | —CH₂CH₂— |
| 104 | (anthraquinone structure with NH₂, SO₃H, NH-phenyl-SO₃H) | —CH₂CH₂— |
| 105 | (anthraquinone structure with NH₂, SO₃H, NH-trimethylphenyl-SO₃H) | —CH₂CH₂— |
| 106 | (complex structure with SO₃H, Cl, N, O, NH(CH₂)₃NH₂, SO₃H) | —CH₂CH₂— |

The procedure given in one of Examples 84 to 106 is repeated, except that a reactive dye in which B is a bridge member of the formula

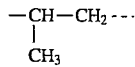

and A is as defined is used instead of the reactive dye of the formula (103), likewise giving a cotton fabric dyed in a brown hue.

The procedure given in one of Examples 84 to 106 is repeated, except that a reactive dye in which B is a bridge member of the formula

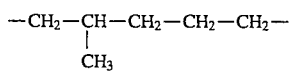

and A is as defined is used instead of the reactive dye of the formula (103), likewise giving a cotton fabric dyed in a brown hue.

The procedure given in one of Examples 84 to 106 is repeated, except that a reactive dye in which B is a bridge member of the formula

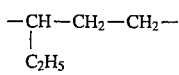

and A is as defined is used instead of the reactive dye of the formula (103), likewise giving a cotton fabric dyed in a brown hue.

Examples 107 to 119

The procedure given in Example 1 is repeated, except that a reactive dye of the formula

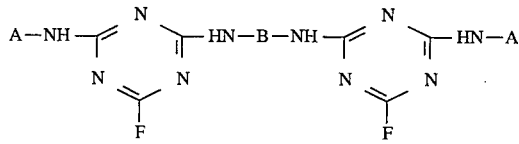

in which A is as defined in column 2 of Table 5 below and B is as defined in column 3, is used instead of the reactive dyes of the formulae (101), (102) and (103), likewise giving a cotton fabric dyed in a brown hue.

TABLE 5

| Ex. | A | B |
|---|---|---|
| 107 | 2,5-disulfophenyl-N=N-[4,8-disulfo-naphthalen-1,4-diyl]-N=N-(2-ureido-5-methylphenyl) structure (SO$_3$H, HO$_3$S on benzene; SO$_3$H on naphthalene; NHCONH$_2$ on tolyl) | $-CH_2CH_2-$ |
| 108 | " | $-(CH_2)_2-O-(CH_2)_2-$ |
| 109 | " | $-(CH_2)_3-O-(CH_2)_2-O-(CH_2)_2-O-(CH_2)_3-$ |
| 110 | " | $-(CH_2)_3-$ |
| 111 | " | $-(CH_2)_6-$ |
| 112 | " | 1,4-phenylene |
| 113 | " | 2-methyl-1,4-phenylene |
| 114 | " | piperazine-1,4-diyl ($-N\underset{\phantom{x}}{\frown}N-$) |
| 115 | " | 4-(2-yl-ethyl)piperazin-1-yl |
| 116 | " | stilbene-2,2'-disulfonic acid-4,4'-diyl |
| 117 | " | 2,2'-disulfo-4,4'-benzamide-diyl (—C$_6$H$_3$(SO$_3$H)—CONH—C$_6$H$_3$(SO$_3$H)—) |
| 118 | 2,5-disulfophenyl-N=N-[4,8-disulfo-naphthalen-1,4-diyl]-N=N-(2-acetamido-5-methylphenyl) structure (with NHCOCH$_3$) | $-CH_2CH_2-$ |

TABLE 5-continued

| Ex. | A | B |
| --- | --- | --- |
| 119 | 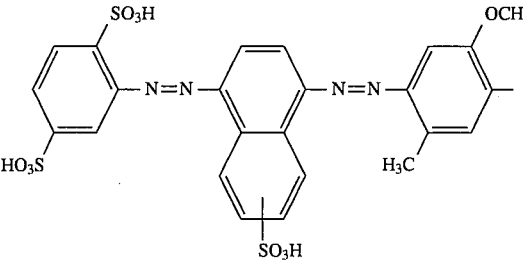 | —CH$_2$CH$_2$— |

The procedure given in one of Examples 107 to 119 is repeated, except that a reactive dye in which B is a bridge member of the formula

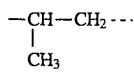

and A is as defined is used instead of the reactive dyes of the formulae (101), (102) and (103), likewise giving a cotton fabric dyed in a brown hue.

The procedure given in one of Examples 107 to 119 is repeated, except that a reactive dye in which B is a bridge member of the formula

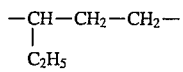

and A is as defined is used instead of the reactive dyes of the formulae (101), (102) and (103), likewise giving a cotton fabric dyed in a brown hue.

The procedure given in one of Examples 107 to 119 is repeated, except that a reactive dye in which B is a bridge member of the formula

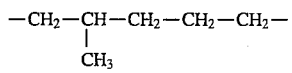

and A is as defined is used instead of the reactive dyes of the formulae (101), (102) and (103), likewise giving a cotton fabric dyed in a brown hue.

Example 120

0.2 part of the yellow-dyeing reactive dye of the formula (101), 0.025 part of the red-dyeing reactive dye of the formula (102) and 0.05 part of the blue-dyeing reactive dye of the formula (103) are dissolved in 1000 parts of water at a temperature of about 70° C. with the addition of 5 parts of sodium sulfate. The dyebath thus produced is entered with 100 parts of a cotton fabric, and the temperature is maintained at 70° C. for about 50 minutes. 10 parts of calcined sodium carbonate and 3 parts of 30% sodium hydroxide are then added. The temperature is maintained at 70 ° C. for another 50 minutes. The liquor is then discharged, the dyed cotton fabric is soaped for 15 minutes using a 0.1% boiling solution of a detergent, then rinsed and dried, giving a cotton fabric dyed in a light-brown shade and having good fastness properties.

The procedure given in Example 120 is repeated, except that sodium sulfate in an amount of 1, 2 or 4 parts or sodium chloride in an amount of 1, 2, 4 or 5 parts is used instead of 5 parts of sodium sulfate, likewise giving a cotton fabric dyed in a light-brown shade.

The procedure given in Example 120 is repeated, except that no sodium sulfate is added, likewise giving a cotton fabric dyed in a light-brown shade.

Example 121

1.5 parts of the orange-dyeing reactive dye of the formula

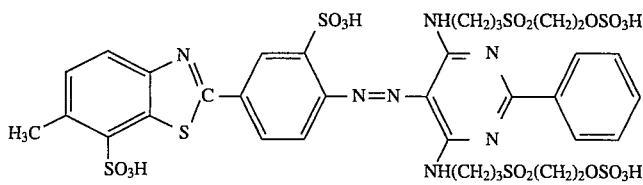

are dissolved in 1000 parts of water at a temperature of about 70° C. with the addition of 6 parts of sodium sulfate. The dyebath thus produced is entered with 100 parts of a cotton fabric, and the temperature is maintained at 70° C. for about 50 minutes. 10 parts of calcined sodium carbonate and 3 parts of 30% sodium hydroxide are then added. The temperature is maintained at 70° C. for another 50 minutes. The liquor is then discharged, the dyed cotton fabric is soaped for 15 minutes using a 0.1% boiling solution of a detergent, then rinsed and dried, giving a cotton fabric dyed in an orange hue and having good fastness properties.

The procedure given in Example 121 is repeated, except that sodium sulfate in an amount of 5, 5.5, 7, 9.5 or 10 parts or sodium chloride in an amount of 5, 5.5, 7, 9.5 or 10 parts is used instead of 6 parts of sodium sulfate, likewise giving a cotton fabric dyed in an orange hue.

Example 122

2.5 parts of the red-dyeing reactive dye of the formula (102) and 2.5 parts of the blue-dyeing reactive dye of the formula

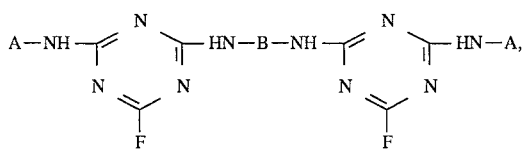

in which B is a bridging member of the formula —CH$_2$CH$_2$— and each A is a radical of the formula

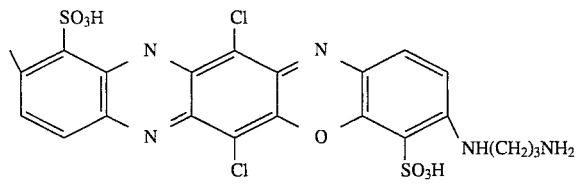

are dissolved in 1000 parts of water at a temperature of about 70° C. with the addition of 10 parts of sodium sulfate. The dyebath thus produced is entered with 100 parts of a cotton fabric, and the temperature is maintained at 70° C. for about 50 minutes. 10 parts of calcined sodium carbonate and 3 parts of 30% sodium hydroxide are then added. The temperature is maintained at 70° C. for another 50 minutes. The liquor is then discharged, the dyed cotton fabric is soaped for 15 minutes using a 0.1% boiling solution of a detergent, then rinsed and dried, giving a cotton fabric dyed in a dark-violet hue and having good fastness properties.

The procedure given in Example 122 is repeated, except that sodium sulfate in an amount of 11, 15, 17 or 20 parts or sodium chloride in an amount of 11, 15, 17 or 20 parts is used instead of 10 parts of sodium sulfate, likewise giving a cotton fabric dyed in a dark-violet shade.

Example 123

0.125 part of a yellow-dyeing reactive dye of the formula (101), 0.125 part of a red-dyeing reactive dye of the formula (102), 0.125 part of a blue-dyeing reactive dye of the formula (103), 0.075 part of a yellow-dyeing disperse dye of the formula

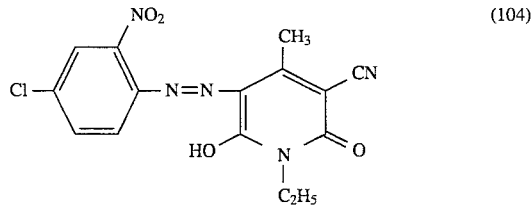

(104)

0.075 part of a red-dyeing disperse dye of the formula

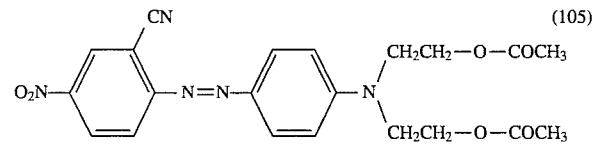

(105)

and 0.075 part of a blue-dyeing disperse dye of the formula

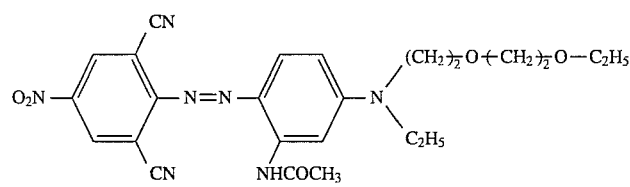

(106)

are dissolved or dispersed in 300 parts of deionised water. 0.2 part of an anionic dispersant and 40 g/l of sodium sulfate are then added, and the pH is brought to 7 using disodium hydrogen phosphate buffer. The dyebath thus produced is entered with 25 parts of a polyester/cotton blend fabric (50/50), the dyebath is heated to a temperature of 130° C. at a heating rate of 1.5° C./minute and left at this temperature for 30 minutes. After cooling to a temperature of about 80° C., the liquor is discharged, the dyed polyester/cotton blend fabric is rinsed with cold and hot water, soaped at the boil and rinsed again, giving a polyester/cotton blend fabric dyed in a brown hue and having good fastness properties.

The procedure given in Example 123 is repeated, except that an equimolar amount of one of the reactive dyes listed in Examples 2 to 57 is used instead of 0.125 part of the reactive dye of the formula (101), likewise giving a polyester/cotton blend fabric dyed in a brown hue.

The procedure given in Example 123 is repeated, except that an equimolar amount of one of the reactive dyes listed in Examples 58 to 83 is used instead of 0.125 part of the reactive dye of the formula (102), likewise giving a polyester/cotton blend fabric dyed in a brown hue.

The procedure given in Example 123 is repeated, except that an equimolar amount of one of the reactive dyes listed in Examples 84 to 106 is used instead of 0.125 part of the reactive dye of the formula (103), likewise giving a polyester/cotton blend fabric dyed in a brown hue.

The procedure given in Example 123 is repeated, except that one of the reactive dyes listed in Examples 107 to 119 is used instead of the reactive dyes of the formulae (101), (102) and (103) likewise giving a polyester/cotton blend fabric dyed in a brown hue.

The procedure given in Example 123 is repeated, except that sodium sulfate or sodium chloride in an amount of 30 parts or 20 parts is used instead of 40 parts of sodium sulfate, likewise giving a polyester/cotton blend fabric dyed in a brown hue.

What is claimed is:

1. A process for the dyeing of cellulose-containing fibre materials with one or more reactive dyes by the exhaust method, which comprises a) carrying out a dyeing step in the presence of a salt of a mineral acid in an amount of 0 to at most 20 g per liter of dyebath and using a tinctorially effective amount of at least one of the reactive dyes of the formulae

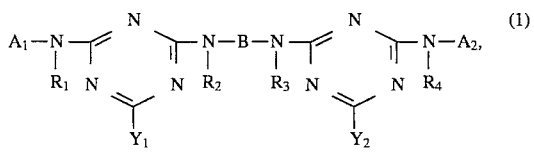

(1)

in which

A$_1$ is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $A_2$, independently of $A_1$, has the meanings of $A_1$, $R_1$, $R_2$, $R_3$ and $R_4$, independently of one another, are hydrogen or substituted or unsubstituted $C_1$–$C_4$alkyl, B is an aliphatic bridging member and $Y_1$ and $Y_2$ are fluorine, or

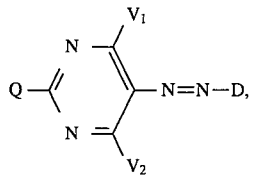 (2)

in which

D is the radical of a diazo component,

Q is a substituted or unsubstituted phenyl or naphthyl radical or a substituted or unsubstituted aromatic-heterocyclic radical and $V_1$ and $V_2$, independently of one another, are a radical of the formula

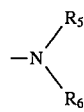 (3)

in which $R_5$ and $R_6$, independently of one another, are hydrogen, substituted or unsubstituted aryl or substituted or unsubstituted $C_1$–$C_6$alkyl, where alkyl, with the exception of methyl, may be interrupted by —O— or —NR'— and R' is hydrogen or $C_1$–$C_4$alkyl, $R_5$ and $R_6$ together with the nitrogen atom linking them form a heterocyclic 5- or 6-membered ring which, if desired, may be further substituted, with the proviso that at least one of the radicals $V_1$, $V_2$ and D contains a fibre-reactive group, and in which dyeing process b) carrying out a fixation step by addition of an effective amount of sodium hydroxide or sodium carbonate.

2. A process according to claim 1, wherein $A_1$ and $A_2$, independently of one another, are the radical of a monoazo, disazo or formazan dye.

3. A process according to claim 1, wherein the radicals $A_1$ and $A_2$ are identical.

4. A process according to claim 1, wherein B is a $C_2$–$C_{12}$alkylene radical, which may be interrupted by 1, 2 or 3 members from the group consisting of —NH—, —N(CH$_3$)— or —O—, or B is a $C_5$–$C_9$ cycloalkylene radical which is unsubstituted or substituted by $C_1$–$C_4$alkyl, $C_1$–$C_4$ alkoxy, $C_2$–$C_4$alkanoylamino, sulfo, halogen or carboxyl.

5. A process according to claim 1, wherein B is

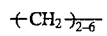

unsubstituted or $C_1$–$C_4$alkyl-substituted cyclohexylene.

6. A process according to claim 1, wherein $R_1$, $R_2$, $R_3$ and $R_4$, independently of one another, are hydrogen, methyl or ethyl.

7. A process according to claim 1, wherein D is the radical of a substituted or unsubstituted aminobenzene, aminonaphthalene, phenylazoaminobenzene, naphthylazoaminobenzene, phenylazoaminonaphthalene or naphthylazoaminonaphthalene.

8. A process according to claim 1, wherein the dye of the formula (2) contains, in the radical $V_1$, $V_2$ or D, a reactive group of the formula

—SO$_2$—Z (4)

in which Z is the radical —CH=CH$_2$ or —CH2—CH$_2$—Y and Y is a leaving group.

9. A process according to claim 8, wherein Y is a group of the formula —Cl, —OSO$_3$H, —SSO$_3$H, —OCO—CH$_3$, —OCO—C$_6$H$_5$ or —OPO$_3$H$_2$.

10. A process according to claim 1, wherein $R_5$ and $R_6$, independently of one another, are hydrogen or a phenyl or naphthyl radical which is unsubstituted or substituted by sulfo, carboxyl, $C_1$–$C_4$alkyl, $C_1$–$C_4$alkoxy, halogen, a reactive radical or a group —N=N—K, in which K is the radical of a coupling component from the benzene or naphthalene series of the heterocyclic series, or are a $C_1$–$C_6$alkyl radical which is unsubstituted or substituted by hydroxyl, sulfo, sulfato, carboxyl, cyano, halogen, $C_1$–$C_4$alkoxycarbonyl, $C_1$–$C_4$alkanoyloxy, carbamoyl or a reactive radical of the formula —SO$_2$—Z, in which Z is the radical —CH=CH$_2$ or —CH$_2$—CH$_2$—Y and Y is a leaving group and which alkyl radical, with the exception of methyl, is, if desired, interrupted by —O— or —NR'—, R' being hydrogen or $C_1$–$C_4$alkyl, or $R_5$ and $R_6$, together with the N atom, form a piperidinyl, piperazinyl or pyrrolidinyl radical which is unsubstituted or substituted by a radical of the formula —(alk)$_p$—SO$_2$—Z, in which alk is $C_1$–$C_6$alkylene, p is the number 0 or 1 and Z is as defined above.

11. Process according to claim 10, wherein $V_1$ and $V_2$ are a radical of the formula (3), in which $R_5$ and $R_6$, independently of one another, are hydrogen or a $C_1$–$C_6$alkyl radical which is unsubstituted or substituted by hydroxyl, sulfo, sulfato, carboxyl, cyano or the group —SO$_2$—Z, in which the alkyl, with the exception of methyl, is, if desired, interrupted by —O— or —NR'— and R' and Z are as defined in claim 10, or are phenyl or naphthyl which is unsubstituted or substituted by $C_1$–$C_4$alkyl, $C_1$–$C_4$alkoxy, $C_2$–$C_4$alkanoylamino, sulfo, halogen or carboxyl, with the proviso that at least one of the radicals $V_1$ and $V_2$ contains a group —SO$_2$—Z.

12. A process according to claim 1, wherein Q is phenyl, 1- or 2-naphthyl, furanyl, thienyl or benzothiazolyl each of which is unsubstituted or substituted by $C_1$–$C_4$alkyl, $C_1$–$C_4$alkoxy, $C_2$–$C_4$alkanoylamino, $C_1$–$C_4$alkoxycarbonyl, $C_1$–$C_4$alkylsulfonyl, halogen, sulfo, trifluoromethyl, nitro or cyano.

13. A process according to claim 1, wherein Q is phenyl which is unsubstituted or substituted by methyl, trifluoromethyl, methoxy, sulfo, nitro, chlorine or bromine.

14. A process according to claim 1, wherein the dye used is a dye of the formula (1) in which $A_1$ and $A_2$, independently of one another, are the radical of a monoazo, disazo or formazan dye, B is a $C_2$–$C_{12}$alkylene radical, which may be interrupted by 1, 2 or 3 members from the group consisting of —NH—, —N(CH$_3$)— or —O—, or B is a $C_5$–$C_9$cycloalkylene radical which is unsubstituted or substituted by $C_1$–$C_4$alkyl, $C_1$–$C_4$alkoxy, $C_2$–$C_4$alkanoylamino, sulfo, halogen or carboxyl, and $Y_1$ and $Y_2$ are fluorine, or is a dye of the formula (2) in which D is the radical of a substituted or unsubstituted aminobenzene, aminonaphthalene, phenylazoaminobenzene, naphthylazoaminobenzene, phenylazoaminonaphthalene or naphthylazoaminonaphthalene, Q is phenyl, 1- or 2-naphthyl, furanyl, thienyl or benzothiazolyl each of which is unsubstituted or substituted by $C_1$–$C_4$alkyl, $C_1$–$C_4$alkoxy, $C_2$–$C_4$alkanoylamino, $C_1$–$C_4$alkoxycarbonyl, $C_1$–$C_4$ alkylsulfonyl, halogen, sulfo, trifluoromethyl, nitro or cyano, and $V_1$ and $V_2$ are a radical of the formula (3) mentioned in claim 1, in which $R_5$ and $R_6$, independently of one another, are hydrogen, phenyl or naphthyl which is unsubstituted or substituted by $C_1$–$C_4$alkyl, $C_1$–$C_4$ alkoxy, $C_2$–$C_4$alkanoylamino, sulfo, halogen or carboxyl or are a $C_1$–$C_6$alkyl radical which is unsubstituted or substituted by hydroxyl, sulfo, sulfato, carboxyl, cyano or the group —$SO_2$—Z, in which alkyl, with the exception of methyl, is, if desired, interrupted by —O— or —NR'—, R' being hydrogen or $C_1$–$C_4$alkyl, Z is a radical of the formula —CH=$CH_2$ or —$CH_2$—$CH_2$—Y and Y is a group of the formula —Cl, —$OSO_3H$, —$SSO_3H$, —OCO—$CH_3$, —OCO— $C_6H_5$ or —$OPO_3H_2$, with the proviso that at least one of the radicals $V_1$ and $V_2$ contains a group —$SO_2$—Z.

15. A process according to claim 1, wherein dyeing is carried out in the presence of the salt of a mineral acid in an amount of 0 to 5 g per liter of dyebath, if the amount of the dye used for dyeing is less than 1 per cent by weight, relative to the weight of the material to be dyed, dyeing is carried out in the presence of the salt of a mineral acid in an amount of 5 to 10 g per liter of dyebath, if the amount of the dye used for dyeing is 1 to 3 per cent by weight, and dyeing is carried out in the presence of the salt of a mineral acid in an amount of 10 to 20 g per liter of dyebath, if the amount of the dye used for dyeing is more than 3 per cent by weight.

16. A process according to claim 1, wherein the salt of a mineral acid is an alkali metal halide or alkali metal sulfate.

17. A process according to claim 1, wherein said cellulose-containing fibre material is cotton.

18. A process for the dyeing of blends of cellulose fibre materials with polyester fibres in the presence of reactive dyes and disperse dyes by the exhaust method, which comprises carrying out the dyeing step in the presence of a salt of a mineral acid in an amount of 0 to at most 40 g per liter of dyebath, at a temperature of 80° to 150° C. and a pH of 5 to 11, and using, as the reactive dyes, a tinctorially effective amount of at least one of the reactive dyes of the formulae

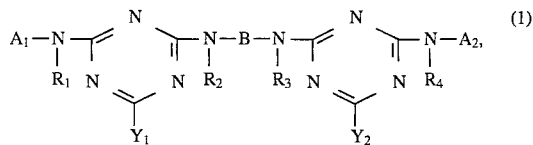

(1)

in which $A_1$ is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $A_2$, independently of $A_1$, has the meanings of $A_1$, $R_1$, $R_2$, $R_3$ and $R_4$, independently of one another, are hydrogen or substituted or unsubstituted $C_1$–$C_4$alkyl, B is an aliphatic bridging member and $Y_1$ and $Y_2$ are fluorine, or

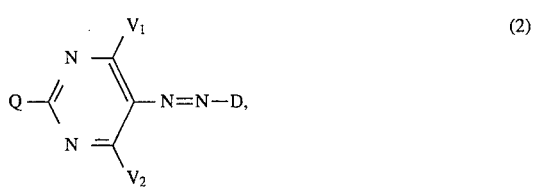

(2)

in which

D is the radical of a diazo component,

Q is a substituted or unsubstituted phenyl or naphthyl radical or a substituted or unsubstituted aromatic-heterocyclic radical and $V_1$ and $V_2$, independently of one another, are a radical of the formula

(3)

in which $R_5$ and $R_6$, independently of one another, are hydrogen, substituted or unsubstituted aryl or substituted or unsubstituted $C_1$–$C_6$alkyl, where alkyl, with the exception of methyl, may be interrupted by —O— or —NR'— and R' is hydrogen or $C_1$ –$C_4$alkyl, or $R_5$ and $R_6$ together with the nitrogen atom linking them form a heterocyclic 5- or 6-membered ring which, if desired, may be further substituted, with the proviso that at least one of the radicals $V_1$, $V_2$ and D contains a fibre-reactive group.

* * * * *